(12) United States Patent
Son et al.

(10) Patent No.: US 11,966,768 B2
(45) Date of Patent: Apr. 23, 2024

(54) APPARATUS AND METHOD FOR MULTI-CLOUD SERVICE PLATFORM

(71) Applicant: ELECTRONICS AND TELECOMMUNICATIONS RESEARCH INSTITUTE, Daejeon (KR)

(72) Inventors: Seok-Ho Son, Daejeon (KR); Dong-Jae Kang, Daejeon (KR); Byoung-Seob Kim, Daejeon (KR); Seung-Jo Bae, Daejeon (KR); Ji-Hoon Seo, Sejong (KR); Byeong-Thaek Oh, Sejong (KR); Kure-Chel Lee, Daejeon (KR); Young-Woo Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 541 days.

(21) Appl. No.: 17/166,726

(22) Filed: Feb. 3, 2021

(65) Prior Publication Data
US 2021/0326161 A1 Oct. 21, 2021

(30) Foreign Application Priority Data
Apr. 17, 2020 (KR) .................. 10-2020-0046740

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4411* (2013.01); *G06F 9/5072* (2013.01);
(Continued)

(58) Field of Classification Search
CPC .. G06F 9/45558; G06F 9/4411; G06F 9/5072; G06F 11/3428; G06F 2009/45562;
(Continued)

(56) References Cited

U.S. PATENT DOCUMENTS 9,014,199 B2 4/2015 Park et al.
9,417,901 B2 8/2016 Choi et al.
(Continued)

FOREIGN PATENT DOCUMENTS

JP 2015-184991 A 10/2015
JP 2016-28479 A 2/2016
(Continued)

OTHER PUBLICATIONS

Loutas et al., "Towards a Reference Architecture for Semantically Interoperable Clouds," 2010, IEEE, pp. 143-150. (Year: 2010).*

*Primary Examiner* — Kenneth Tang

(57) ABSTRACT

Disclosed herein are an apparatus and method for a multi-cloud service platform. The apparatus includes one or more processors and executable memory for storing at least one program executed by the one or more processors. The at least one program may receive a service request from a user client device, generate a multi-cloud infrastructure service using multiple clouds in response to the service request, make the multiple clouds interoperate with mufti-cloud infrastructure in order to provide the multi-cloud infrastructure service, and generate a multi-cloud application runtime environment corresponding to the multi-cloud infrastructure service.

8 Claims, 23 Drawing Sheets

(51) Int. Cl.
*G06F 9/50* (2006.01)
*G06F 11/34* (2006.01)

(52) U.S. Cl.
CPC .............. *G06F 11/3428* (2013.01); *G06F 2009/45562* (2013.01); *G06F 2009/4557* (2013.01); *G06F 2009/45595* (2013.01)

(58) Field of Classification Search
CPC ... G06F 2009/4557; G06F 2009/45595; G06F 11/3006; G06F 11/301; G06F 11/3055; G06F 9/5077; G06F 9/45504; G06F 15/16; H04L 41/5041
See application file for complete search history.

(56) References Cited

U.S. PATENT DOCUMENTS

| | | | |
|---|---|---|---|
| 9,705,816 | B2 | 7/2017 | Kim et al. |
| 10,452,451 | B2 | 10/2019 | Miraftabzadeh et al. |
| 11,385,938 | B2 | 7/2022 | Kim |
| 11,656,900 | B2 | 5/2023 | Vincent et al. |
| 2011/0214124 | A1* | 9/2011 | Ferris .................. G06F 8/63 718/1 |
| 2013/0204849 | A1* | 8/2013 | Chacko ................ G06F 3/0604 707/692 |
| 2015/0195128 | A1 | 7/2015 | Kim et al. |
| 2015/0261514 | A1* | 9/2015 | Fu ........................ G06F 8/63 718/1 |
| 2016/0294643 | A1* | 10/2016 | Kim ....................... H04L 41/40 |
| 2017/0244613 | A1* | 8/2017 | Vasudevan ............ G06F 9/5072 |
| 2018/0367632 | A1* | 12/2018 | Oh ........................ H04L 67/51 |
| 2019/0205182 | A1* | 7/2019 | Sivasubramanian ... G06F 9/542 |
| 2021/0382912 | A1* | 12/2021 | Horowitz .............. H04L 63/166 |

FOREIGN PATENT DOCUMENTS

| | | |
|---|---|---|
| KR | 20120116773 A | 10/2012 |
| KR | 10-2013-0068197 A | 6/2013 |
| KR | 10-1479978 B1 | 1/2015 |
| KR | 10-2016-0045388 A | 4/2016 |
| KR | 10-1826498 B1 | 2/2018 |
| KR | 20190088594 A | 7/2019 |
| KR | 10-2020049 B1 | 11/2019 |

* cited by examiner

APPARATUS AND METHOD FOR MULTI-CLOUD SERVICE PLATFORM

CROSS REFERENCE TO RELATED APPLICATION

This application claims the benefit of Korean Patent Application No. 10-2020-0046740, filed Apr. 17, 2020, which is hereby incorporated by reference in its entirety into this application.

BACKGROUND OF THE INVENTION

1. Technical Field

The present invention relates generally to technology for a multi-cloud service platform and more particularly to software platform technology for effectively operating and managing the resources and services of multiple cloud-computing devices and supporting the operation of applications in a cloud-computing environment.

2. Description of the Related Art

For cloud services and computing resources for business a single cloud or a data center is mainly used. The use of a single cloud may cause problems, such as the risk of service interruption, limited computing resources and services, dependence on a specific cloud service provider, and the like. Also, a single cloud service has a disadvantage in that a user must directly request a cloud to generate a virtual machine (VM), to make a network connection to a VM group, to configure an application runtime environment (application execution environment), to monitor the VM and the execution environment, to perform resource scaling, and the like.

Accordingly, the number of users of a multi-cloud service based on the use of multiple clouds (that is, software development and operation using multiple clouds or multiple cloud service providers) and the number of businesses using such a multi-cloud service are increasing.

That is, cloud services and computing resources for future business require a computing platform based on multiple clouds, which is capable of providing optimal cloud service to users through integrated use of various types of multiple clouds, rather than using a single cloud.

Meanwhile, Korean Patent Application Publication No. 10-2019-0088594, titled "Method for running cloud-based media service supporting multi-DRM and recording medium for performing the method", discloses a method for running a cloud-based media service supporting multi-DRM, which is configured such that a content provider is able to apply Digital Rights Management (DRM) technology to multiple media service platforms after purchasing the same, and a recording medium for performing the method.

SUMMARY OF THE INVENTION

An object of the present invention is to enable the resources and services of multiple clouds to be operated and managed in common and to provide an application runtime environment in order flu a user to easily develop and distribute an application.

Another object of the present invention is to provide interoperating with multi-cloud infrastructure, control and management of multi-cloud infrastructure, and plug-in-based dynamic expansion of a cloud.

A further object of the present invention is to provide integrated management for a multi-cloud infrastructure service suitable for user requirements.

Yet another object of the present invention is to provide an environment for facilitating the management of a multi-cloud infrastructure service and application and to guarantee the quality and availability thereof.

In order to accomplish the above objects, an apparatus for a multi-cloud service platform according to an embodiment of the present invention includes one or more processors and executable memory for storing at least one program executed by the one or more processors. The at least one program may receive a service request from a user client device, generate a multi-cloud infrastructure service using multiple clouds in response to the service request, make the multiple clouds interoperate with multi-cloud infrastructure in order to provide the multi-cloud infrastructure service, and generate a multi-cloud application runtime environment corresponding to the multi-cloud infrastructure service.

Here, the at least one program may generate the multi-cloud infrastructure service using computing machines corresponding to the service request, among computing machines included in the multiple clouds.

Here, the at least one program may collect static information about specifications of the computing machines and dynamic performance information about the result of a benchmark performed on the computing machines and determine whether the computing machines correspond to the service request based on the collected information.

Here, the at least one program ma collect information about network latency between the computing machines and select computing machines between Which the network latency is equal to or less than a preset delay time.

Here, the at least one program ma make the multiple clouds interoperate with the multi-cloud infrastructure using cloud drivers of the multiple clouds, the cloud drivers complying with a common interface specification.

Here, the at least one program may register the cloud drivers of the multiple clouds in a common cloud driver shared library and make the multiple clouds intemperate with the multi-cloud infrastructure using the cloud drivers registered in the common cloud driver shared library.

Here, the at least one program may generate the multi-cloud application runtime environment using an application image corresponding to the multi-cloud infrastructure service.

Also, in order to accomplish the above objects, a method for a multi-cloud service platform, performed by an apparatus for the multi-cloud service platform, according to an embodiment of the present invention includes receiving a service request from a user client device; generating a multi-cloud infrastructure service using multiple clouds in response to the service request; making the multiple clouds interoperate with multi-cloud infrastructure in order to provide the multi-cloud infrastructure service; and generating a multi-cloud application runtime environment corresponding to the multi-cloud infrastructure service.

Here, generating, the multi-cloud infrastructure service may be configured to generate the multi-cloud infrastructure service using computing machines corresponding to the service request, among computing machines included in the multiple clouds.

Here, generating, the multi-cloud infrastructure service may be configured to collect static information about specifications of the computing machines and dynamic performance information about the result of a benchmark performed on die computing machines and to determine whether the computing machines correspond to the service request based on the collected information.

Here, generating the multi-cloud infrastructure service may be configured to collect information about network latency between the computing machines and to select computing machines between which the network latency is equal to or less than a preset delay time.

Here, making the multiple clouds interoperate with the multi-cloud infrastructure may be configured to make the multiple clouds intemperate with the multi-cloud infrastructure using cloud drivers of the multiple clouds, the cloud drivers complying with a common interface specification.

Here, making the multiple clouds interoperate with the multi-cloud infrastructure may be configured to register the cloud drivers of the multiple clouds in a common cloud driver shared library and to make the multiple clouds intemperate with the multi-cloud infrastructure using the cloud drivers registered in the con non cloud driver shared library.

Here, generating the multi-cloud application runtime environment may be configured to generate the multi-cloud application runtime environment using an application image corresponding to the multi-cloud infrastructure service.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
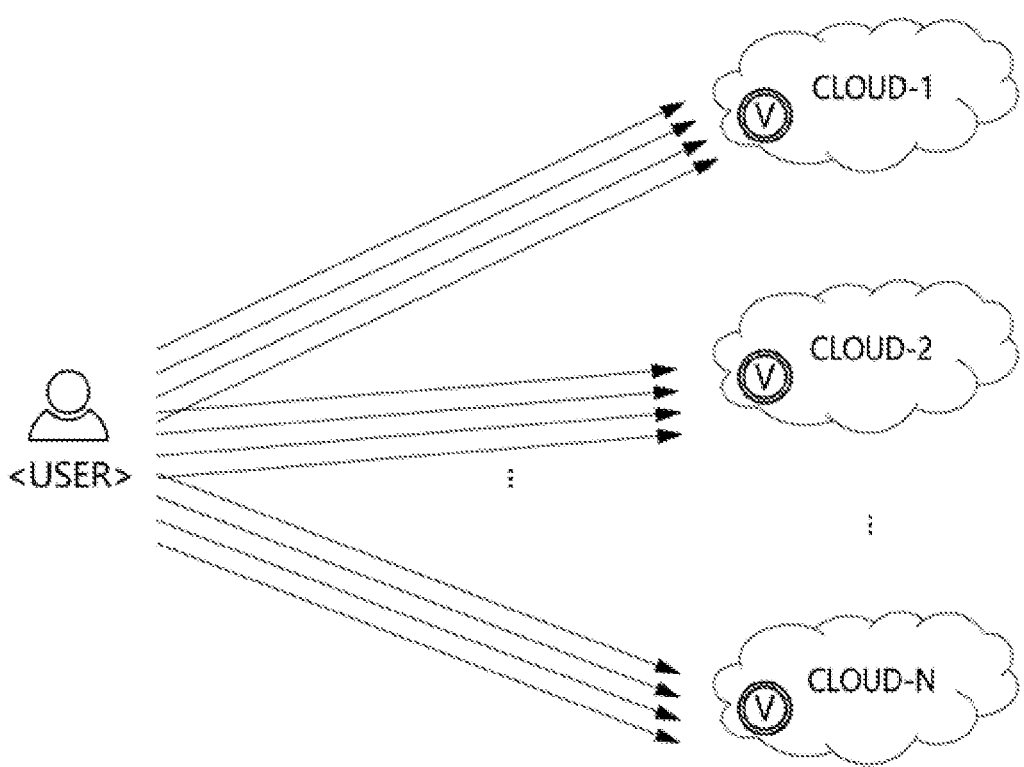
FIG. 1 is a view illustrating an example of a multi-cloud system.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated m order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a view illustrating an example of a multi-cloud system.

Referring to FIG. 1, it can be seen that, in a general multi-cloud system, a user directly requests each cloud to generate a VM, make a network connection to a VM group, configure an application runtime environment, monitor the M and the execution environment, perform resource scaling, and the like.

Figure 2:
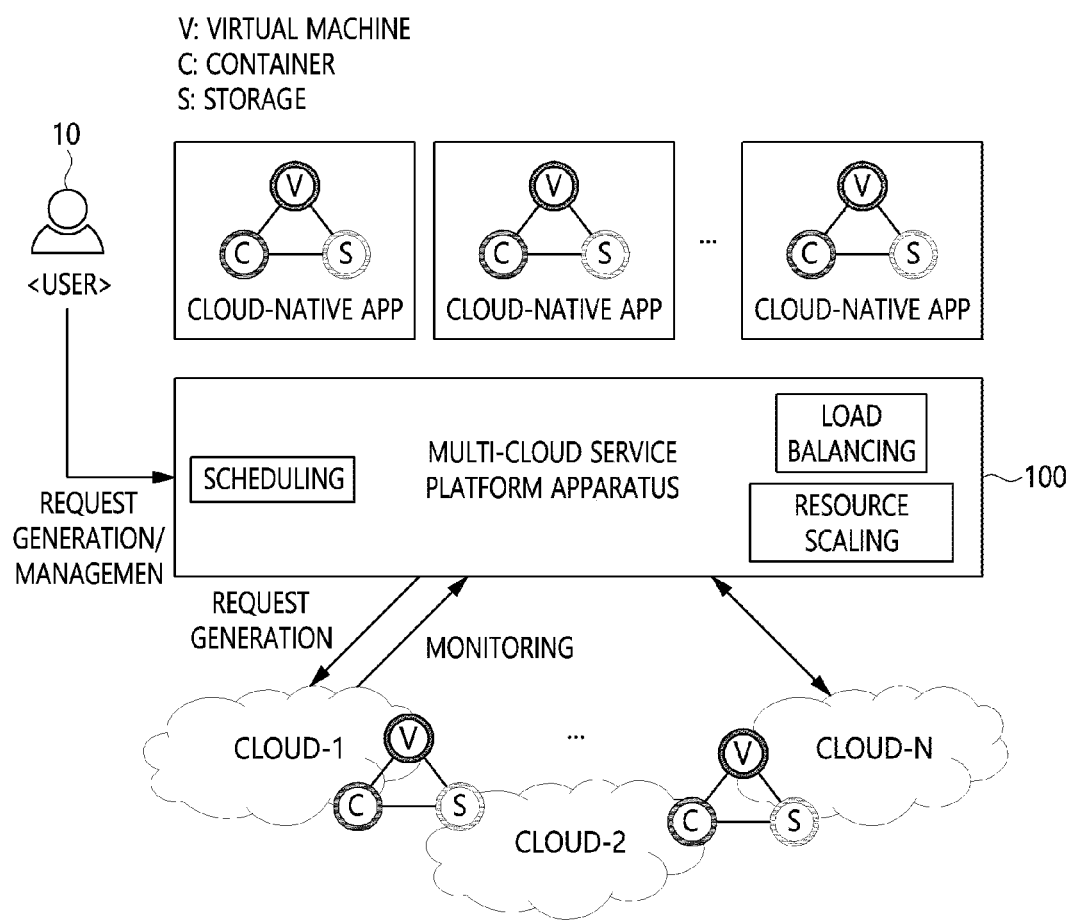
FIG. 2 is a view illustrating a multi-cloud service platform system according to an embodiment of the present invention.

FIG. 2 is a view illustrating a multi-cloud service platform system according to an embodiment of the present invention.

Referring to FIG. 2, the multi-cloud service platform system according to an embodiment of the present invention includes a multi-cloud service platform apparatus 100, multiple clouds, and cloud-native applications.

A user client device 10 may request the multi-cloud service platform apparatus 100 to generate and manage a service.

The multi-cloud service platform apparatus 100 may schedule multi-cloud infrastructure resources.

Here, the multi-cloud service platform apparatus 100 may request the veneration of a multi-cloud infrastructure service by interoperating with the multiple clouds.

Here, the multi-cloud service platform apparatus 100 may collect information acquired by monitoring the multiple clouds.

Here, the multi-cloud service platform apparatus 100 may provide an integrated interoperating function for a multi-cloud infrastructure service using load balancing and resource scheduling.

Here, the multi-cloud service platform apparatus 100 may support interoperating with infrastructure of the multiple clouds.

Here, the multi-cloud service platform apparatus 100 may provide interoperating with various types of cloud infrastructure and plug-in-based dynamic expansion of a cloud.

Here, the multi-cloud service platform apparatus 100 may provide uniform control and management for various types of cloud infrastructure.

Here, the multi-cloud service platform apparatus 100 may support integrated management for multi-cloud infrastructure services.

Here, the multi-cloud service platform apparatus 100 may provide optimal deployment of multi-cloud infrastructure services suitable for user requirements.

Here, the multi-cloud service platform apparatus 100 may support single-point management of various cloud infrastructure services.

Here, the multi-cloud service platform apparatus 100 may provide integrated interoperating functions (a VPN a load balancer, and the like) for multi-cloud infrastructure services.

Here, the multi-cloud service platform apparatus 100 may support integrated monitoring of the multiple clouds.

Here, the multi-cloud service platform apparatus 100 may provide information about various states of multi-cloud infrastructure services and applications.

Here, the mufti-cloud service platform apparatus 100 may support integrated management of multi-cloud applications.

Here, the multi-cloud service platform apparatus 100 may provide an optimal environment for executing multi-cloud applications and a convenient management environment.

Here, the multi-cloud service platform apparatus 100 may guarantee the quality and availability of the multi-cloud applications.

Here, the multi-cloud service platform apparatus 100 may provide an open API and tools for common subsystems of multi-cloud services.

Here, the multi-cloud service platform apparatus 100 may provide an open API for managing the services and resources of the multiple clouds.

Here, the multi-cloud service platform apparatus 100 may provide a web UI and a command-line interface (CLI) for use convenience in a multi-cloud environment.

Here, the multi-cloud service platform apparatus 100 may provide a subsystem structure and microservice-based architecture.

Figure 3:
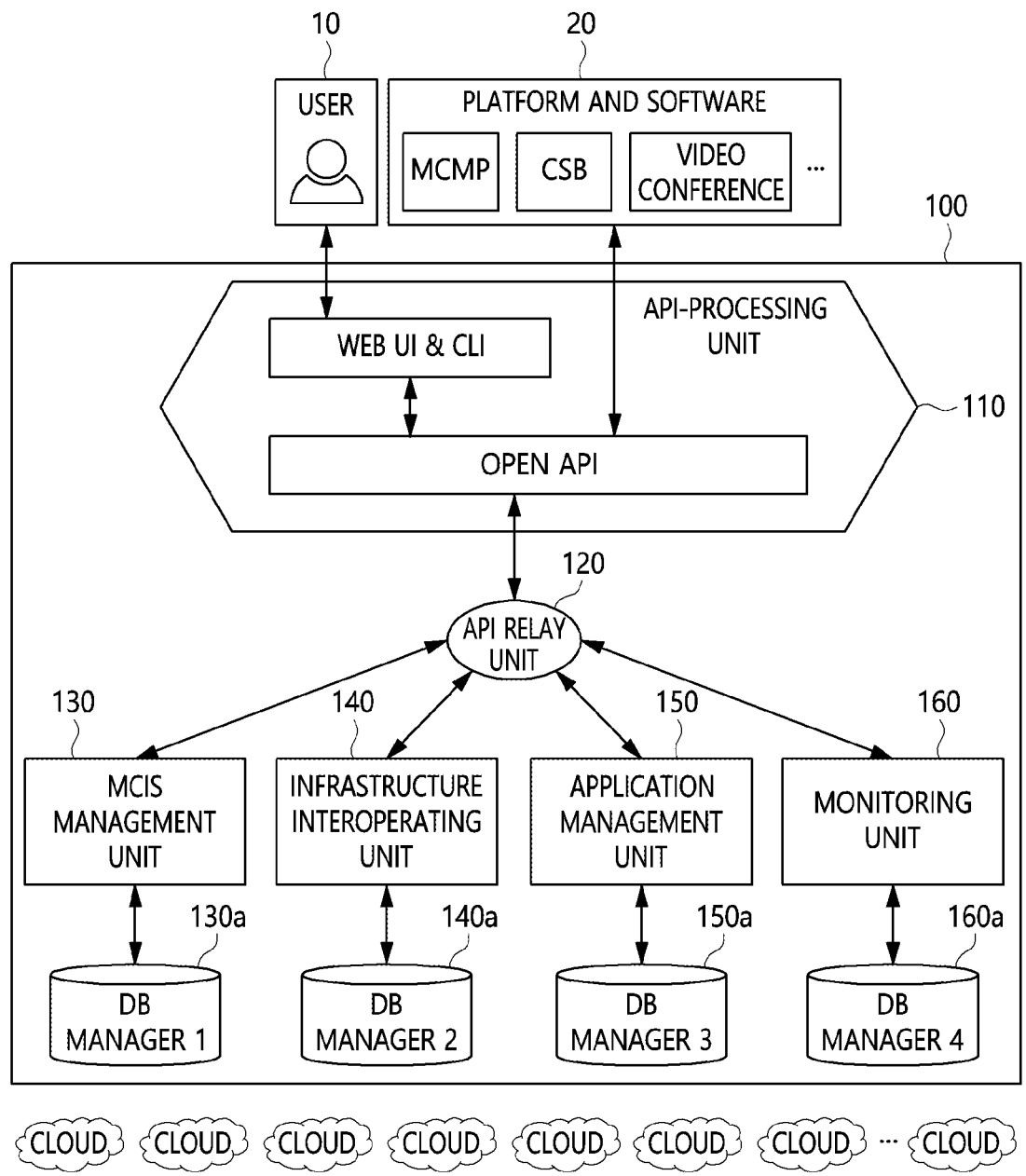
FIG. 3 is a block diagram illustrating an apparatus for a multi-cloud service platform according to an embodiment of the present invention.

FIG. 3 is a block diagram illustrating a multi-cloud service platform apparatus according to an embodiment of the present invention.

Referring to FIG. 3, the multi-cloud service platform apparatus 100 according to an embodiment of the present invention includes an API-processing unit 110, an API relay unit 120, an MCIS management unit 130, an infrastructure interoperating unit 140, an application management unit 150, and a monitoring unit 160.

The MCIS management unit 130, the infrastructure interoperating unit 140, the application management unit 150, and the monitoring unit 160, which are individual subsystems, may provide the core functions of the platform.

The MCIS management unit 130, the infrastructure interoperating unit 140, the application management unit 150, and the monitoring unit 160 may realize the respective subsystems by taking the form of microservices.

The microservice form may be a software architecture that structuralizes individual function modules as independent service units, thereby enabling flexible integration and reduction of development complexity.

The MCIS management unit 130, the infrastructure interoperating unit 140, the application management unit 150, and the monitoring unit 160 may manage internal operation information through DB manager 1 130a, DB manager 2 140a, DB manager 3 150a, and DB manager 4 160a, which are respective operation information managers.

The API-processing unit HO may receive a service request from a user client device 10.

Here, the APE-processing unit 110 may provide an open API for using the system, and a web user interface (UI) and a command-line interface (CLI) for management convenience.

Here, the API-processing unit 110 may provide the functions of a multi-cloud infrastructure service to the user client device 10 through the web UI, the CLI, and the open API.

Here, the API-processing unit 110 may provide the functions of a multi-cloud infrastructure service to platforms and software 20 through the open API.

For example, the platforms and the software 20 may include a multi-cloud management platform (MCMP), a cloud service brokerage platform (CSB), and the like.

Here, the API-processing unit 110 may provide the user interfaces of the platforms.

The APE relay unit 120 may provide interoperating and convenience in function expansion by relaying an API between the subsystems.

The API relay unit 120 may receive requests for required functions from the subsystems and return the results thereof.

The MCIS management unit 130 may generate a multi-cloud infrastructure service (MCIS) using multiple clouds in response to a service request.

Here, the MCIS management unit 130 may enable operation and integrated management of the multi-cloud infrastructure service that supports optimal deployment based on the user requirements.

Here, the MCIS management unit 130 may generate a multi-cloud infrastructure service using computing machines corresponding to the service request, among computing machines included in the multiple clouds.

Here, the types of the computing, machines may include a virtual machine, a container machine, and the like. In the detailed description of the present invention, a virtual machine: (VM) is described as an example of the computing machine.

Here, the MCIS management unit 130 may collect static information about the specifications of the computing machines and dynamic performance information about the result of a benchmark performed on the computing machines, and may determine whether the computing machines correspond to the service request based on the collected information.

Here, the MCIS management unit 130 may collect information about network latency between the computing machines, and may select computing machines between which the latency is equal to or less than a preset delay time.

The infrastructure interoperating unit 140 may make the multiple clouds interoperate with the multi-cloud infrastructure in order to provide the multi-cloud infrastructure service.

Here, the infrastructure interoperating unit 140 may interoperate with heterogeneous infrastructure using plug-ins, and manage and control the same using a consistent method.

Here, the infrastructure interoperating unit 140 may make the multiple clouds intemperate with the multi-cloud infrastructure using the cloud drivers of the multiple clouds, which comply with a common interface specification.

Here, the infrastructure interoperating unit 140 may register the cloud drivers of the multiple clouds in a common cloud driver shared library, and may make the multiple clouds interoperate with the multi-cloud infrastructure using the cloud drivers registered in the common cloud driver shared library.

The application management unit 150 may generate a multi-cloud application runtime environment corresponding to the multi-cloud infrastructure service.

Here, the application management unit 150 may support multi-cloud application operation and management for guaranteeing the stability and quality of applications.

Here, the application management unit 150 may generate a multi-cloud application runtime environment using an application image corresponding to the multi-cloud infrastructure service.

The monitoring unit 160 may provide monitoring of the multi-cloud infrastructure service (MCIS), computing resources included in the MCIS, application workloads, and the application runtime environment.

Here, the monitoring unit 160 may provide monitoring information for optimizing the management of the multi-cloud infrastructure service and the multi-cloud applications.

Figure 4:
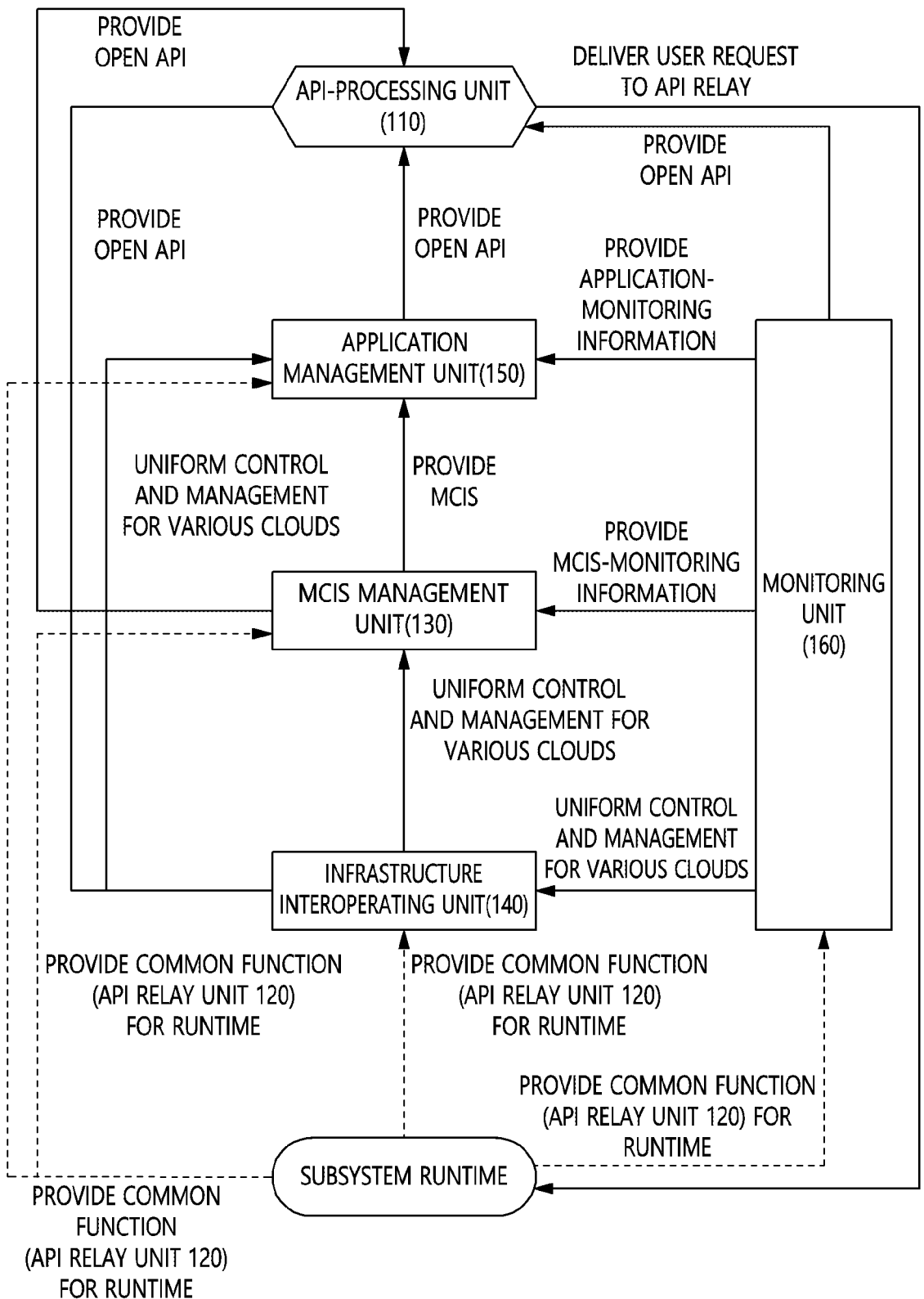
FIG. 4 is a view illustrating the process of operating, an apparatus for a multi-cloud service platform according to an embodiment of the present invention.

FIG. 4 is a view illustrating the process of operating a multi-cloud service platform apparatus according to an embodiment of the present invention.

Referring to FIG. 4, it can be seen that the process of operating a multi-cloud service platform apparatus 100 according to an embodiment of the present invention is illustrated.

The API-processing unit 110 may receive a service request from a user client device 10 and deliver the same to the API relay unit 120.

The API relay unit 120 may provide a common function for subsystem runtime to the MCIS management unit 130, the infrastructure interoperating unit 140, the application management unit 150, and the monitoring unit 160.

The intra ti interoperating unit 140 may support uniform control and management for the CIS management unit 130, the application management unit 150, and the monitoring unit 160 by interoperating with various clouds.

Here, the infrastructure interoperating unit 140 may provide an open API to the API-processing unit 110.

The MCIS management unit 130 may provide an MCIS to the application management unit 150.

Here, the MCIS management unit 130 may provide an open API to the API-processing unit 110.

The application management unit 150 may provide an open API to the API-processing unit 110.

The monitoring unit 160 may provide MCIS-monitoring information to the MCIS management unit 130.

Here, the monitoring unit 160 may provide application-monitoring information to the application management unit 150.

Here, the monitoring unit 160 may provide an open API to the API-processing unit 110.

Figure 5:
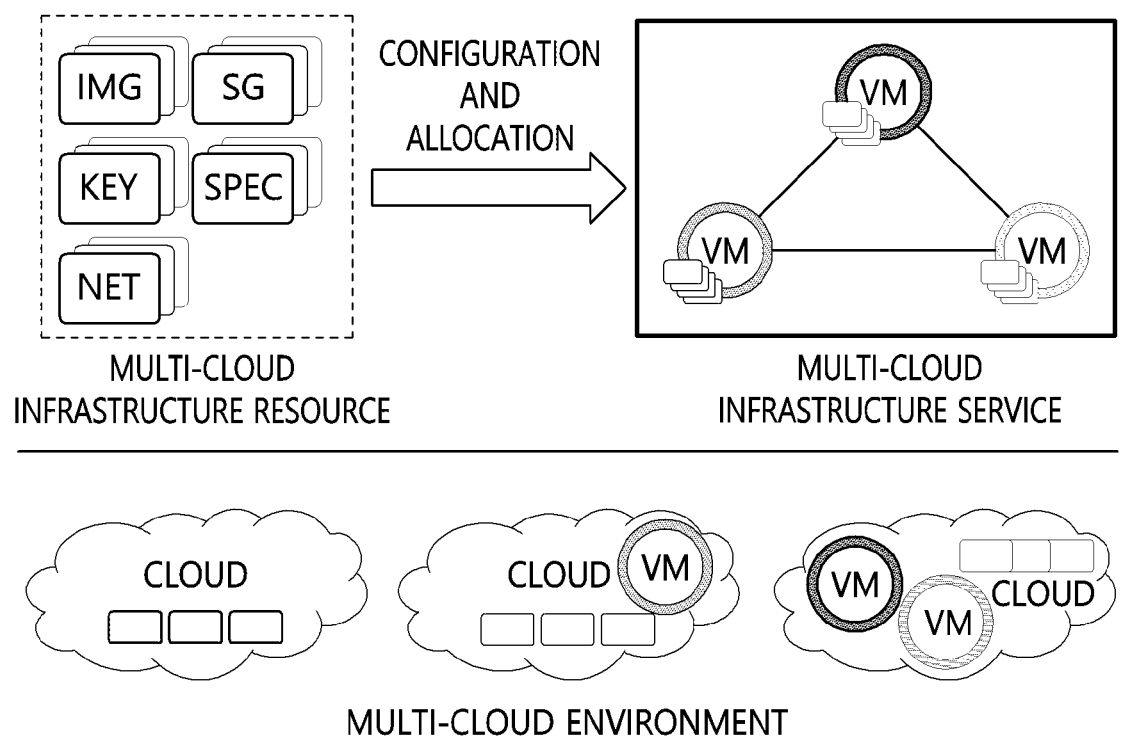
FIG. 5 is a view illustrating the relationship between a multi-cloud infrastructure service and multi-cloud infrastructure resources according to an embodiment of the present invention.

FIG. 5 is a view illustrating the relationship between a multi-cloud infrastructure service and multi-cloud infrastructure resources according to an embodiment of the present invention.

Referring to FIG. 5, it can be seen that the concepts of the multi-cloud infrastructure resources and service to be managed by the MCIS management unit 130 in an integrated manner are illustrated.

The multi-cloud infrastructure resource (MCIR) may include cloud infrastructure resources for generating and operating an MCIS provided on multiple clouds.

The cloud infrastructure resources may include images, specifications of VMs, networks and resources for accessing to VMs, and the like.

The multi-cloud infrastructure service (MCIS) may correspond to a group of one or more cloud infrastructure services (a virtual machine (VM), a container machine (CM), and the like) interconnected for a single purpose (an application service, an application, or the like) on locally isolated multiple clouds.

The multi-cloud infrastructure resources may be used for configuring a multi-cloud infrastructure service.

User resources may be resources registered in the system for user convenience.

The cloud infrastructure resources may be resources of cloud service providers.

The multi-cloud infrastructure service may be a logical group of on or more cloud infrastructure services.

Figure 6:
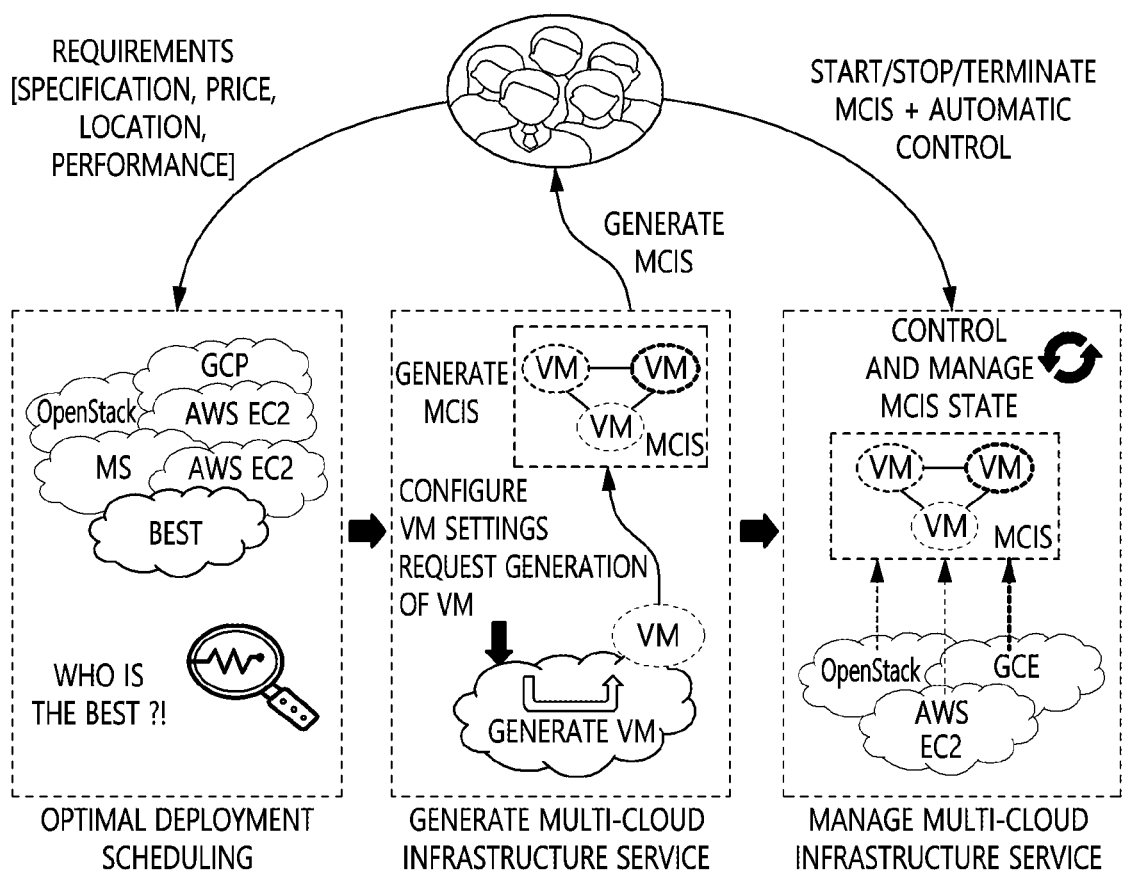
FIG. 6 is a view illustrating an integrated management function for a multi-cloud infrastructure service according to an embodiment of the present invention.

FIG. 6 is a view illustrating an integrated management function for a multi-cloud infrastructure service according to an embodiment of the present invention.

Referring to FIG. 6, it can be seen that functions provided by the MCIS management runt 130 are illustrated.

The MCIS management unit 130 may deploy and schedule the optimal MCIR according to various requirements of a user.

Here, the MCIS management unit 130 may provision actual VMs through multiple cloud service providers.

Here, the MCIS management unit 130 may configure the generated VMs as an MCIS, and may manage the lifecycle of the MCIS.

Here, the MCIS management unit 130 may collect static information and dynamic information for an MCIS deployment plan for optimal MCIS deployment and scheduling.

The static information may include information that is not frequently changed and that can be collected through metadata.

The dynamic information may include information that must be collected through measurement because the information is frequently changed.

Here, the MCIS management, unit 130 may optimally deploy VMs based on the static information and the dynamic information, and may support optimal deployment in units of MCISs by considering VMs that are geographically distant from each other across multiple clouds.

Figure 7:
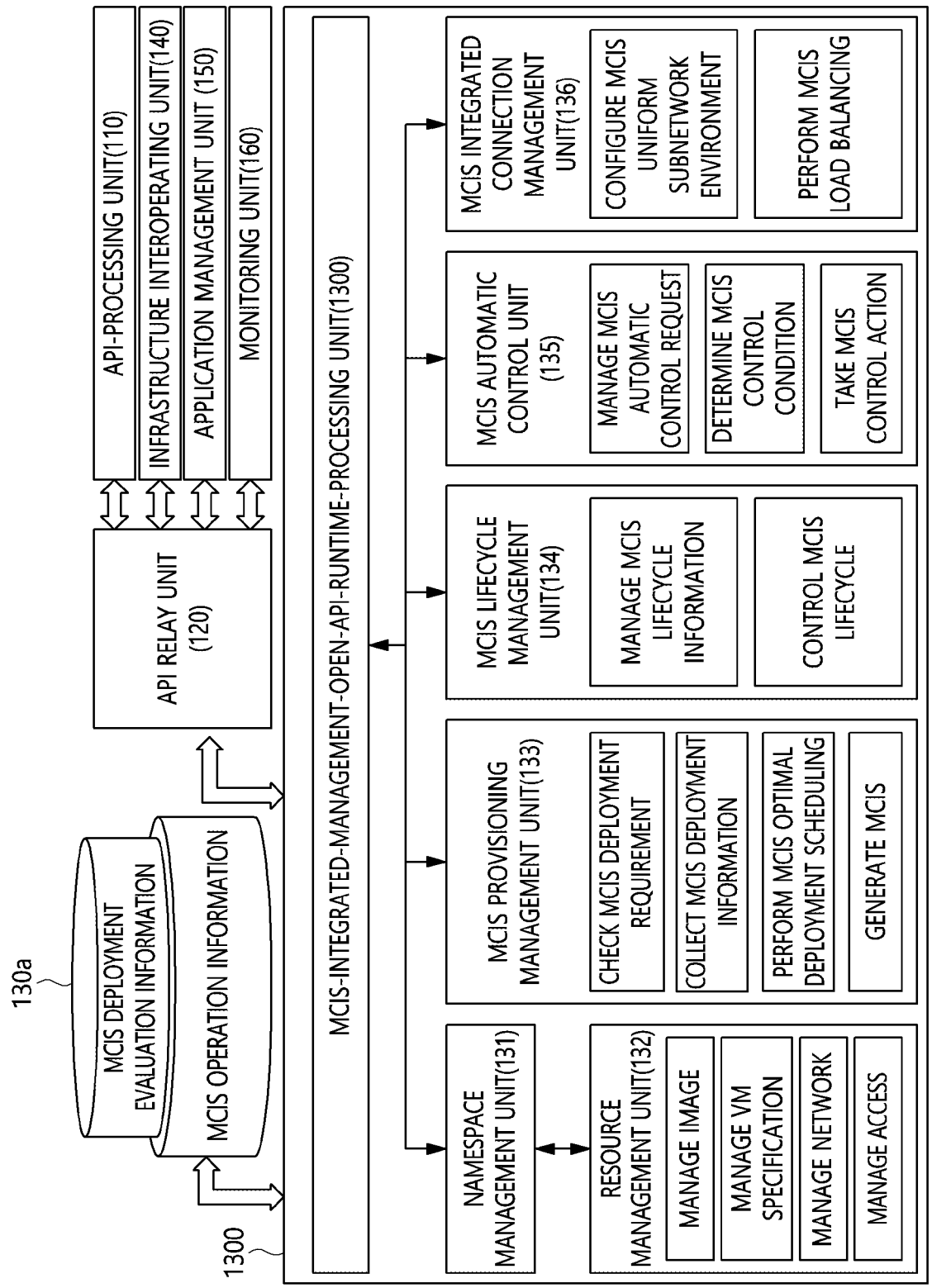
FIG. 7 is a block diagram illustrating a specific example of the MCIS management unit illustrated in FIG. 3.
Figure 8:
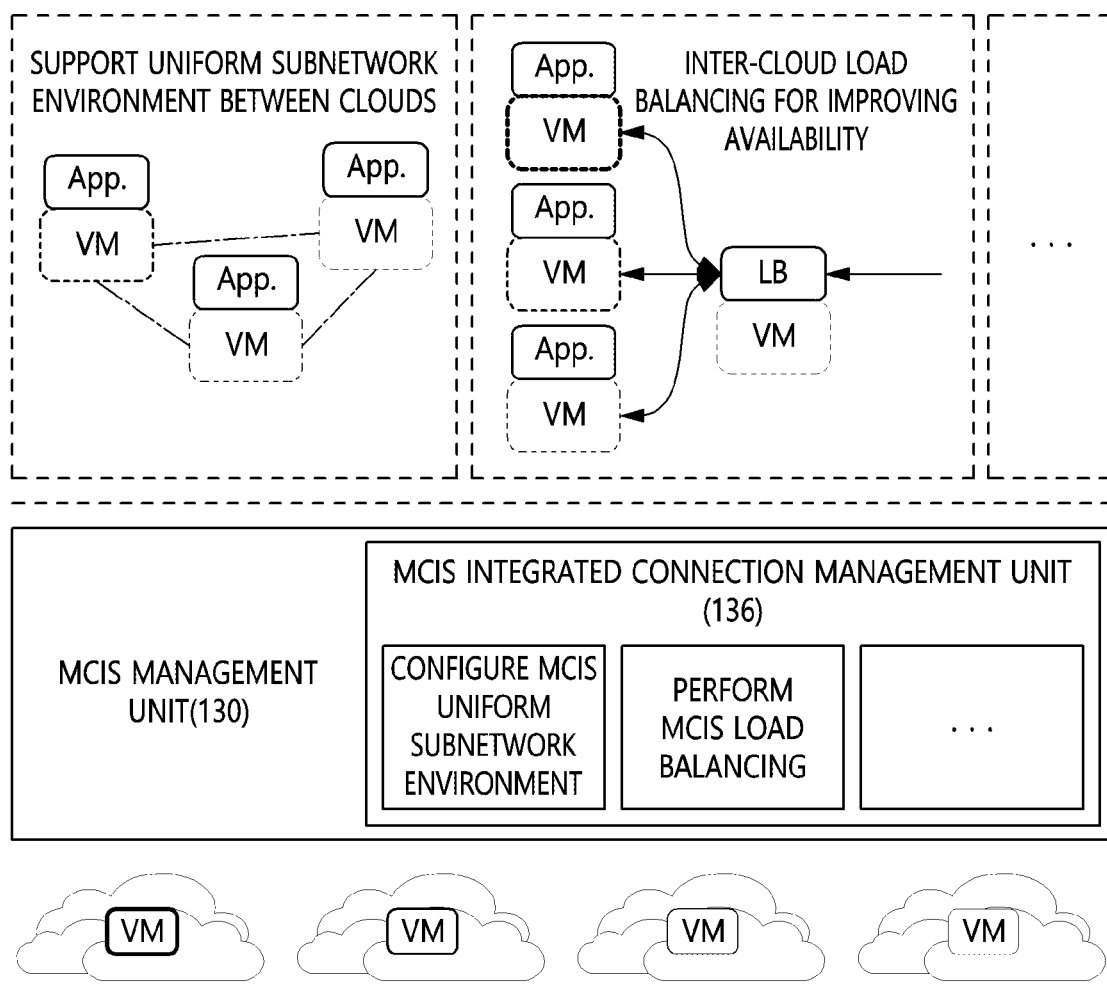
FIG. 8 is a view illustrating an integrated connection function for an MCIS according to an embodiment of the present invention.
Figure 9:
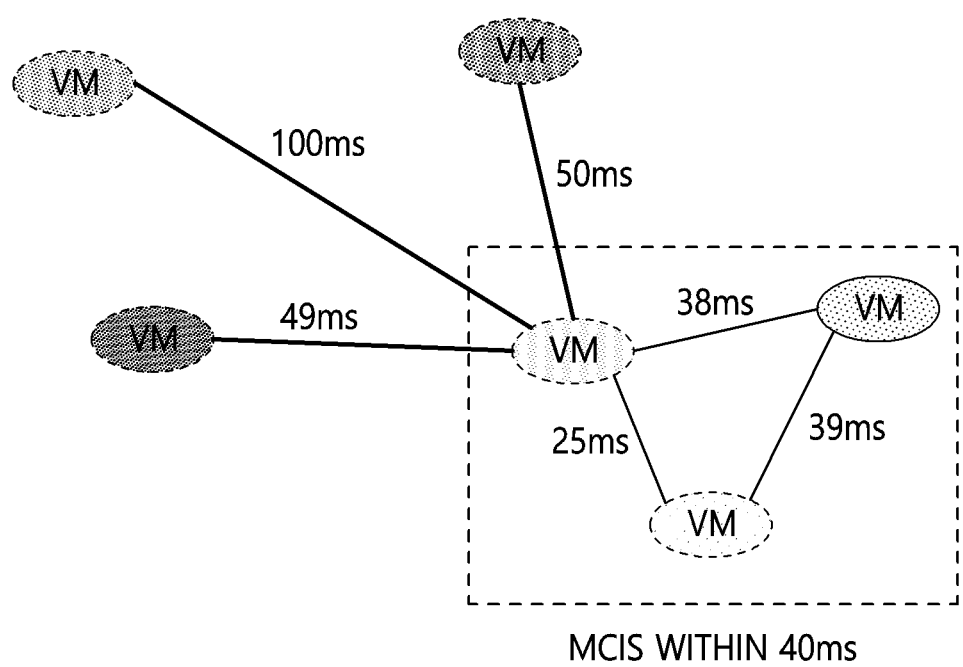
FIG. 9 is a view illustrating an MCIS integrated optimal deployment scheduling function according to an embodiment of the present invention.
Figure 10:
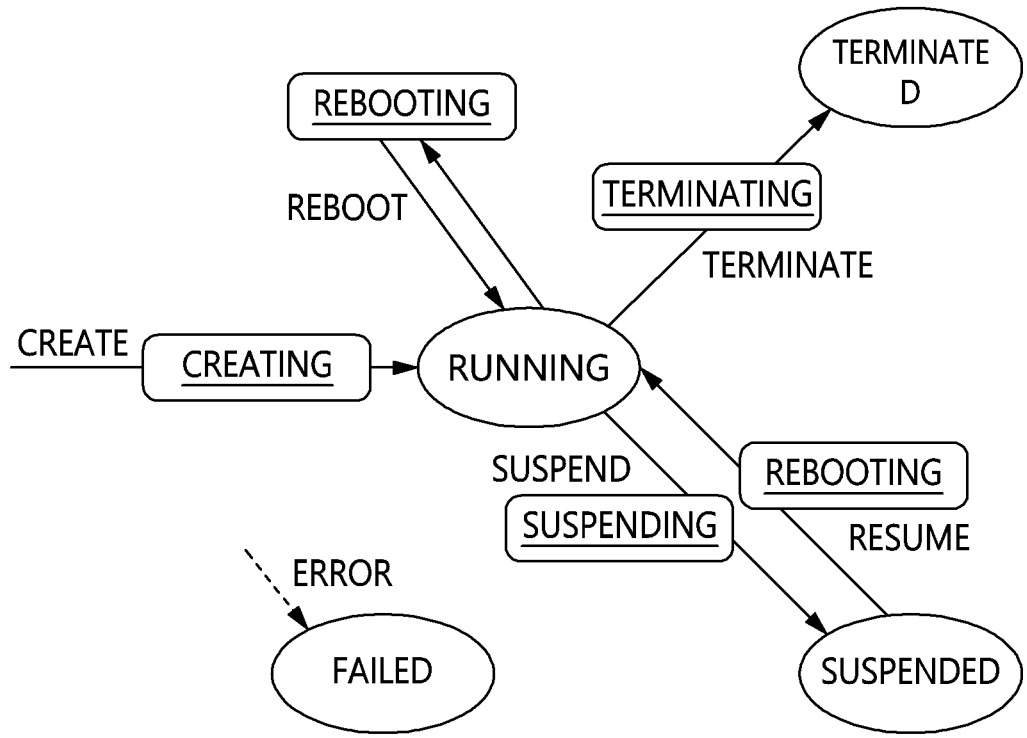
FIG. 10 is a view illustrating, MC IS lifecycle states and transition according to an embodiment of the present invention.

FIG. 7 is a block diagram illustrating a specific example of the MCIS management unit illustrated in FIG. 3. FIG. 8 is a view illustrating an integrated connection function tot an MCIS according to an embodiment of the present invention. FIG. 9 is a view illustrating an MCIS integrated optimal deployment scheduling function according to an embodiment of the present invention. FIG. 10 is a view illustrating MCIS lifecycle states and transition according to an embodiment of the present invention.

Referring to FIG. 7, the MCIS management unit 130 may include a namespace management unit 131, a resource management unit 132, an MCIS provisioning management unit 133, an MCIS lifecycle management unit 134, an MCIS automatic control unit 135, an MCIS integrated connection management unit 136, and an MCIS-integrated-management-open-API-runtime-processing unit 1300.

The namespace management unit 131 may assign a namespace to which objects belong using a namespace.

Here, when objects having the same name are included in different namespaces, the namespace management unit 131 may distinguish these objects by assigning the namespaces.

Here, the namespace management unit 131 may logically separate all of the MCIRs and MCISs of a user using namespaces.

Here, the namespace management unit 131 may search for and control objects on a namespace basis.

For example, the namespace management unit 131 assigns different namespaces for the respective projects of a user, thereby isolating the MCIR and MCIS of each of the projects.

Here, the namespace management unit 131 may provide a management function to the user client device 10 such that the user client device 10 is capable of generating, retrieving, or deleting a namespace object.

Here, the namespace management unit 131 may generate an information object having a namespace name requested by the user client device 10 and previously generated universally unique identifier (UUID) information using a namespace object generation function.

Here, the namespace management unit 131 may provide a list of all of the namespaces by providing a namespace object retrieval function to the user client device 10.

Here, the namespace management unit 131 may specify a UUID through the name of the namespace.

The specified UUID may include basic information that is required in order to request retrieval and control of the MCIR and MCIS.

Here, the namespace management unit 131 may retrieve information about an MCIR and an MCIS included in the namespace using a namespace object deletion function.

Here, when the namespace includes any of an MCIR and an MCIS, the namespace management unit 131 may not allow the deletion of the namespace.

Here, the namespace management unit 131 may delete the namespace only after all of the MCIRs and MCISs assigned to the namespace are deleted.

The resource management unit 132 may provide a function capable of managing cloud infrastructure resources, which are used in order for respective clouds to provide infrastructure services, in a centralized manner.

Here, the resource management unit 132 may manage the infrastructure resources of each cloud as the objects to be used for configuring and setting an MCIS.

Here, the resource management unit 132 may enable generation, registration, retrieval, and deletion functions for various resource types of the MCIR (images, specifications of VMs, networks, resources for accessing to VMs, and the like).

Here, the resource management unit 132 may manage the image resource of a VIM that can be included in the MCIS.

Here, the resource management unit 132 may register a VM image in the system.

The registered image may become a system object having an identifier.

Here, the registered image may be used as a parameter when a VM is generated.

Here, the resource management unit 132 may provide the user client device 10 with a management function for registering, retrieving or deleting an image.

Also, the resource management unit 132 may manage the specification resource of as VM that can be included in the MCIS.

The VM specification resource may be an object corresponding to the specification of a VM defined by a cloud service provider.

Here, the resource management unit 132 may receive the registration of a VM specification resource from the user client device 10.

The registered VM specification resource may become a system object having an identifier.

When the specification of the VM to be managed is selected, the VM specification object corresponding thereto may be multiple objects according to the cloud service providers.

The VM specification object may be used as a parameter when a 1M is generated.

Here, the resource management unit 132 may provide the user client device 10 with a management function capable of retrieving and deleting a VM specification resource.

Here, the resource management unit 132 may include at least one of the number of vCPUs, a memory size, and a storage size as main specification factors managed by the system.

Also, the resource management unit 132 may manage a virtual network resource that can be included in the MCIS.

The virtual net, resource may be an object corresponding to a virtual network resource defined by a cloud service provide.

Here, the resource management unit 132 may receive, from the user client device 10, the registration of a virtual network resource provided by the cloud service provider.

The registered virtual network resource may become a system object having an identifier.

The virtual network resource may be used as a parameter when a VM is generated.

Here, the resource management unit 132 may provide a management function capable of retrieving and deleting a virtual network resource to the user client device 10.

Also, the resource management unit 132 may manage (register, retrieve, or delete) resources required for accessing to VMs included in an MCIS.

The resource related to connection with a VM may include a network security group (an item group for designating accessible network ports), an access security key for accessing a VM through a secure shell (SSH), and the like.

The MCIS provisioning management unit 133 may manage the entire procedure of generating an MCIS.

Here, the MCIS provisioning management unit 133 may generate VMs, which are to become components of an MCIS, in order to generate an MCIS, configure the settings of the generated VMs, and include the VMs in a logical object, namely the MCIS.

Here, the MCIS provisioning management unit 133 may optimally deploy and schedule VMs in order to generate an individual VM, and may select VMs that best match the service requirements for each MCIS, thereby provisioning the optimal MCIS to a user.

Here, the MCIS provisioning management unit 133 may check MCIS deployment requirements.

Here, the MCIS provisioning management unit 133 may check whether there is an error in the deployment requirements for the MCIS requested by the user client device 10, and may determine whether provisioning is possible based on the information managed by the MCIS management unit 130.

Here, when a user requirement that cannot be provisioned is included in the requirements, the MCIS provisioning management unit 133 does not perform MCIS provisioning, and may tell the user client device 10 that provisioning is impossible.

Also, the MCIS provisioning management unit 133 may collect MCIS deployment information.

The MCIS deployment information may include static information and dynamic information.

The static information may include specifications, locations, prices, and the like, and the dynamic information may include performance information and the like.

Here, the MCIS provisioning management unit 133 may collect static information about VM specifications, and may periodically collect dynamic, performance information through a VM benchmark or the like.

Here, the MCIS provisioning management unit 133 may provide the collected information as base data for an MCIS optimal deployment scheduling algorithm.

Also, the MCIS provisioning management unit 133 may perform MCIS optimal deployment scheduling.

The MCIS optimal deployment scheduling a algorithm nay include algorithms for performing optimal deployment based on various factors.

Here, the MCIS provisioning management unit 133 may support optimal deployment for each MCIS.

Here, the MCIS provisioning management unit 133 collects information about network latency between VMs located across multiple clouds, thereby providing a deployment function such that the network latency between all of the VMs in the MCIS requested by a user is equal to or less than a few milliseconds.

Referring to FIG. 9, it can be seen that an example of deployment based on network latency between VMs is illustrated. When network latency equal to or less than 40 milliseconds is set as the acceptable latency in an MCIS, the MCIS integrated optimal deployment function may optimally configure an MCIS by including only VMs that satisfy the constraint therein using the information about the network latency between VMs.

Also, the MCIS provisioning management unit 133 may provide a VM-specification-based deployment algorithm, a VM-location-based deployment algorithm a VM-price-based deployment algorithm, a VM-performance-based deployment algorithm, VM-composite-condition-based deployment algorithm, and the like depending on the optimal deployment conditions for the respective VMs in order to optimally configure an MCIS.

The VM-specification-based deployment algorithm may recommend and deploy VMs based on the specification of a VM requested by the user client device 10.

The VM-location-based deployment algorithm may recommend and deploy optimal VMs in ascending order of distance from the region selected by the user client device 10.

The VIM-price-based deployment algorithm may recommend and deploy VMs that are capable of providing the specification required by the user client device 10 at the lowest cost.

The VM-performance-based deployment algorithm may recommend and deploy VMs based on the performance required by the user client device 10 using the information provided through an MCIS deployment information collection function (a performance benchmark or the like).

For example, the performance factors of a VM may include computation performance, memory read/write performance, file I/O performance, and the like.

The VM-composite-condition-based deployment algorithm is an algorithm that can be used when it is necessary to collectively consider the above-described multiple factors, and may recommend and deploy VMs using the weighted sum of the above-described algorithms (e.g., an equation capable of representing user preferences tot the respective algorithms).

Also, the MCIS provisioning management unit 133 may generate an MCIS.

Here, the MCIS provisioning management unit 133 may generate an MCIS object, and may generate a VM be included in the MCIS object using the VM generation function of the infrastructure interoperating unit 140.

Here, the MCIS provisioning management unit 133 may generate an MCIS through a generation request step and a generation configuration step.

Here, after all of the VMs requested by the user client device 10 are generated, the MCIS provisioning management unit 133 may input generation and access information related to the VMs to the ICIS object and return the result to the user client device 10.

The MCIS lifecycle management unit 134 may provide management and control functions for the lifecycle and state of an MCIS after the MCIS is generated and provisioned to the user client device 10.

Here, the MCIS lifecycle management unit 134 may manage the states (a running state, a suspended state, a terminated state, and the like) of the MCIS lifecycle for each MCIS and VMs included therein.

Here, the MCIS lifecycle management unit 134 may check whether the lifecycle state of the MCIS is the same as the lifecycle state of the actual VM managed by a cloud service provider, and may synchronize the lifecycle state of the MCIS and the lifecycle state of the actual VM with each other.

Here, the MCIS lifecycle management unit 134 may handle a lifecycle-related control request received from the user client device 10.

Referring to FIG. 10, it can be seen that an example of the lifecycle states of an MCIS is illustrated. The lifecycle states may include transition states and final states.

The transition states may include a 'creating' state, a 'suspending' state, a 'resuming' state, a 'rebooting' state, and a 'terminating' state.

The 'creating' state may be a state in which creation of an MCIS is in progress.

The 'suspending' state may be a state in which suspension of an MCIS is in progress.

The 'resuming' state may be a state in which resumption of a suspended MCIS is in progress.

The 'rebooting' state may be a state in which an MCIS is being rebooted.

The 'terminating' state may be a state in which termination of an MCIS is in progress.

The final states may include a 'running' state, a 'suspended' state, a 'failed' state, and a 'terminated' state.

The 'running' state may be a state in which an MCIS is running.

The 'suspended' state may be a state in which an MCIS is suspended.

The 'failed' state may be a state in which an MCIS is stopped due to an error.

The 'terminated' state may be a state in which an MCIS is terminated.

The MCIS automatic control unit 135 may automatically control an MCIS based on rules specified by a user.

Here, the MCIS automatic control unit 135 may receive a state condition for automatically controlling an MCIS from the user client device 10, and may suggest a specific action to be automatically performed based on whether the state condition is satisfied or unsatisfied.

Here, the MCIS automatic control unit 135 may provide a functional mechanism for satisfying various conditions of the user client device 10 and taking actions.

Here, the MCIS automatic control unit 135 may manage requirements for MCIS automatic control.

Here, the MCIS automatic control unit 135 may register, retrieve, or delete an MCIS automatic control request from the user client device 10.

Also, the MCIS automatic control unit. 135 may determine a condition for MCIS control.

Here, the MCIS automatic control unit 135 may continuously check whether the current state of the MCIS matches the state condition requested by the user client device 10 through monitoring, and may trigger automatic control when it is determined that the current state of the MCIS matches the state condition.

Also, the MCIS automatic control unit 135 may take an MCIS control action.

Here, the MCIS automatic control unit 135 may take the action requested by the user client device 10 when automatic control is triggered.

The MCIS integrated connection management unit 136 may support execution of distributed applications based on an MCIS that includes VMs geographically distributed based on multiple clouds.

Referring to FIG. 8, the MCIS integrated connection management unit 136 may provide a uniform subnetwork environment in order to support execution of distributed applications, and may improve the availability of an MCIS by balancing loads between clouds.

Here, the MCIS integrated connection management unit 136 may perform an MCIS uniform subnetwork environment configuration function, an MCIS-load-balancing function, and the like.

Here, the MCIS integrated connection management unit 136 may receive the selection of at least one of the uniform subnetwork environment configuration function and the load-balancing function from the user client device 10, and may deploy the MCIS using the function selected by the user client device 10.

Here, the MCIS integrated connection management unit 136 may generate an integrated connection service environment based on the MCIS, the deployment of which is completed.

The MCIS-integrated-management-open-API-runtime-processing unit 1300 provides the functions of an MCIS to another subsystem or a user, and may include an open API runtime server therefor.

Here, the MCIS-integrated-management-open-API-runtime-processing unit 1300 may include an open API client for using the functions of other subsystems.

Also, the MCIS management unit 130 may communicate with the infrastructure interoperating unit 140 in order to generate a VM or resources, and may communicate with the monitoring unit 160 in order to share the current state of an MCIR.

Here, the MCIS management unit 130 may use the functions of other subsystems through communication, and may further include a relay in order to relay the communication therebetween.

Figure 11:
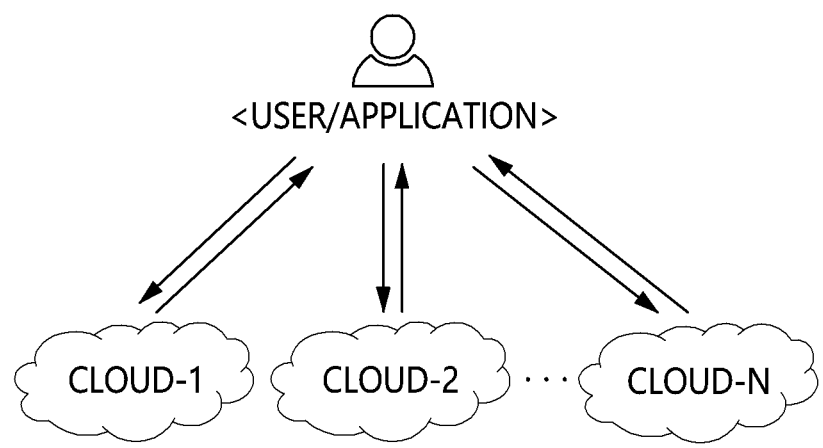
FIG. 11 is a view illustrating a multi-cloud user environment.

FIG. 11 is a view illustrating a multi-cloud user environment.

Referring to FIG. 11, in the multi-cloud service user environment, clouds may be used only by a user having a professional skill to use each cloud infrastructure, or may be used only through an application for each cloud infrastructure or a bespoke program developed by a professional developer. The professional developer requires information about conditions for using different connection and authentication methods and resources, methods for configuring the same, and complicated development and tests using different user APIs for respective clouds. The multi-cloud service development method and the service user environment illustrated in FIG. 11 may be available at the beginning of the use of multi-cloud computing, but when demand for multi-cloud services and the number of users of the multi-cloud services increase, a problem may occur in the process of developing and running the service.

Figure 12:
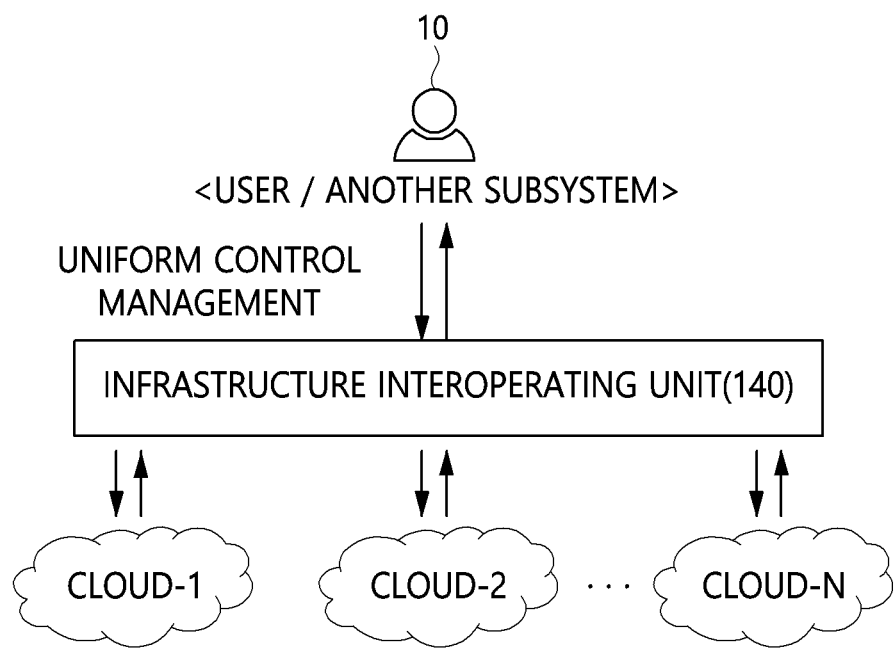
FIG. 12 is a view illustrating the user environment of the infrastructure interoperating unit illustrated in FIG. 3.

FIG. 12 is a view illustrating the user environment of the infrastructure interoperating unit illustrated in FIG. 3.

Referring to FIG. 12, the infrastructure interoperating unit 140 of the multi-cloud service platform apparatus 100 may solve problems associated with interoperating with heterogeneous cloud infrastructure.

The infrastructure interoperating unit 140 may provide a user client device 10 and other subsystems with a uniform interoperating and control management method for different types of cloud infrastructure.

Here, the infrastructure interoperating unit 140 may provide uniform control management by providing a common API based on a common interface driver.

Here, the infrastructure interoperating unit 140 may enable dynamic addition of a view cloud using a dynamic plug-in, thereby expanding cloud resources.

Here, the infrastructure interoperating win 140 may support improvement in the accuracy of selection of cloud infrastructure by providing a history of interoperating with clouds.

Figure 13:
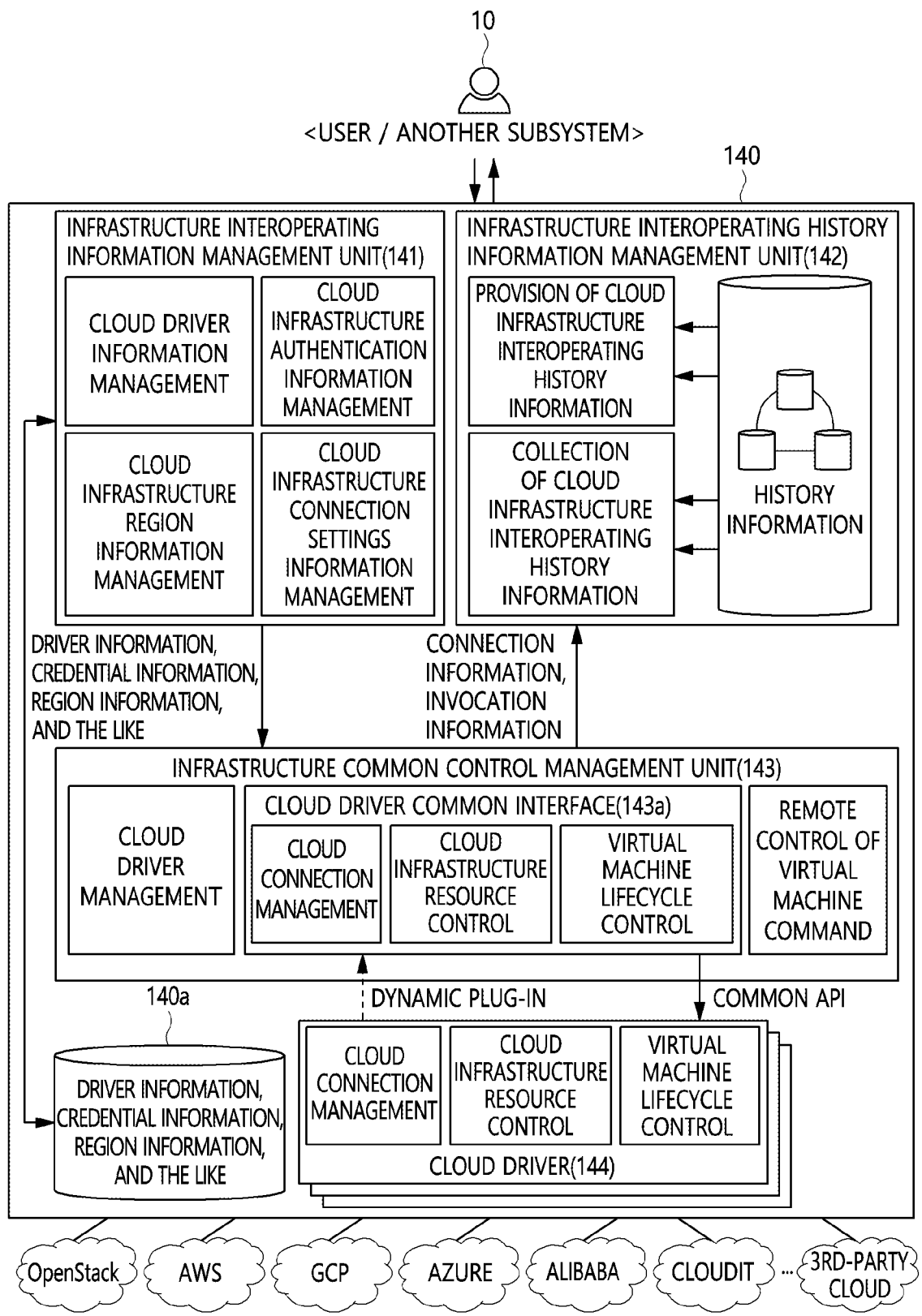
FIG. 13 is a block diagram illustrating a specific example of the infrastructure interoperating unit illustrated in FIG. 3.
Figure 14:
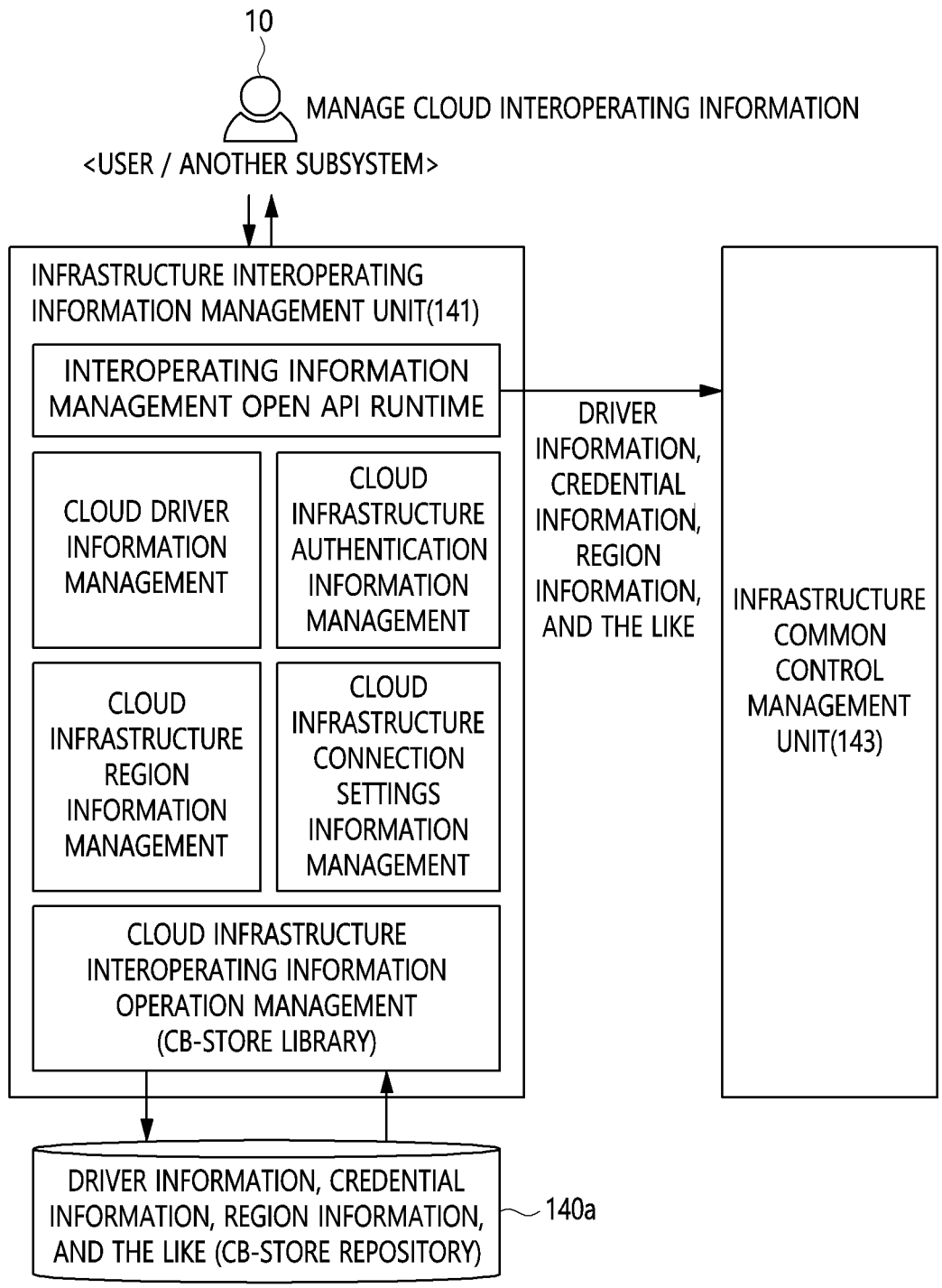
FIG. 14 is a block diagram illustrating a specific example of the infrastructure interoperating information management unit illustrated in FIG. 13.
Figure 15:
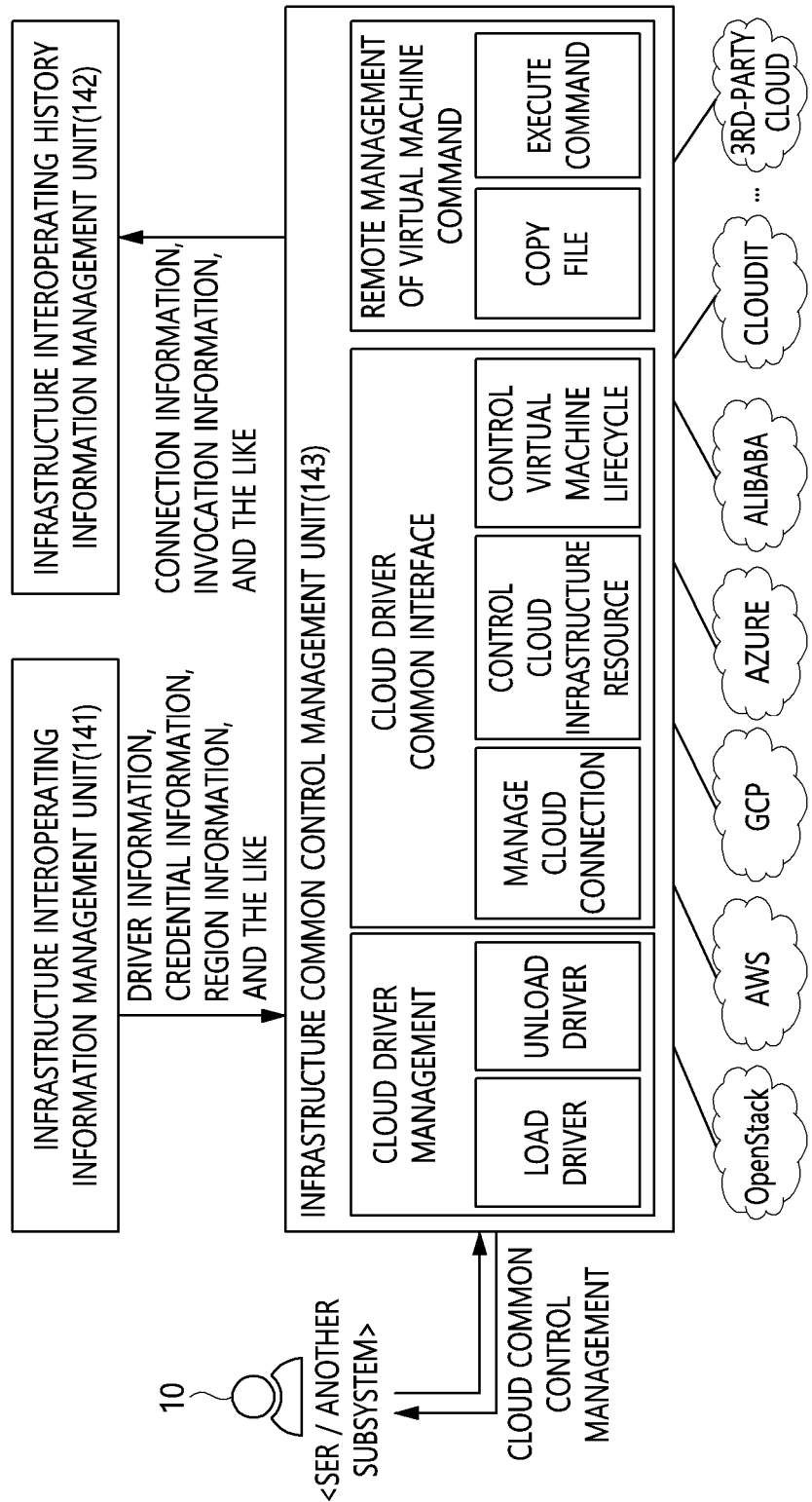
FIG. 15 is a block diagram illustrating a specific example of the infrastructure common control management unit illustrated in FIG. 13.
Figure 16:
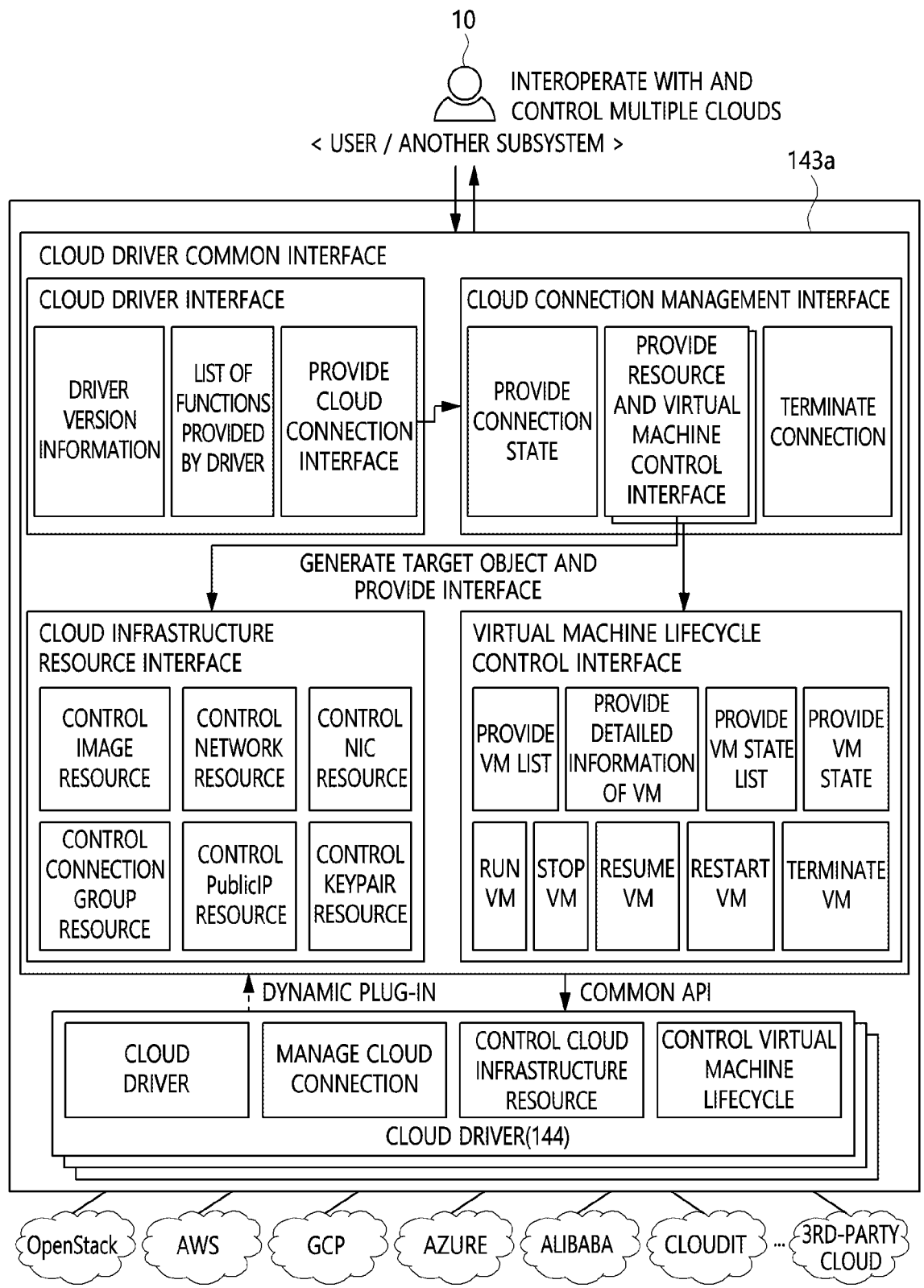
FIG. 16 is a block diagram illustrating a specific example of the cloud driver common interface illustrated in FIG. 13.
Figure 17:
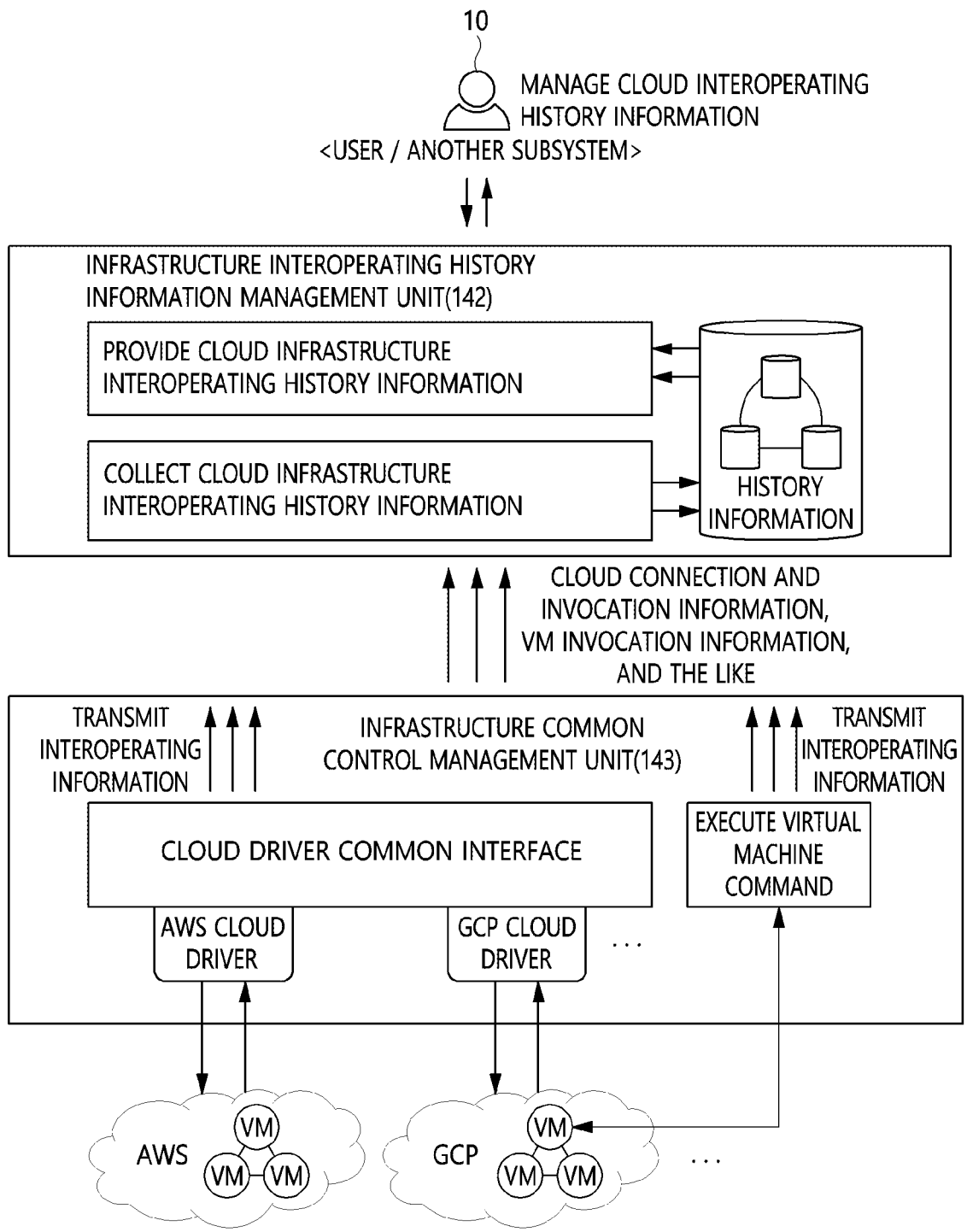
FIG. 17 is a block diagram illustrating a specific example of the interoperating history information management unit illustrated in FIG. 13.
Figure 18:
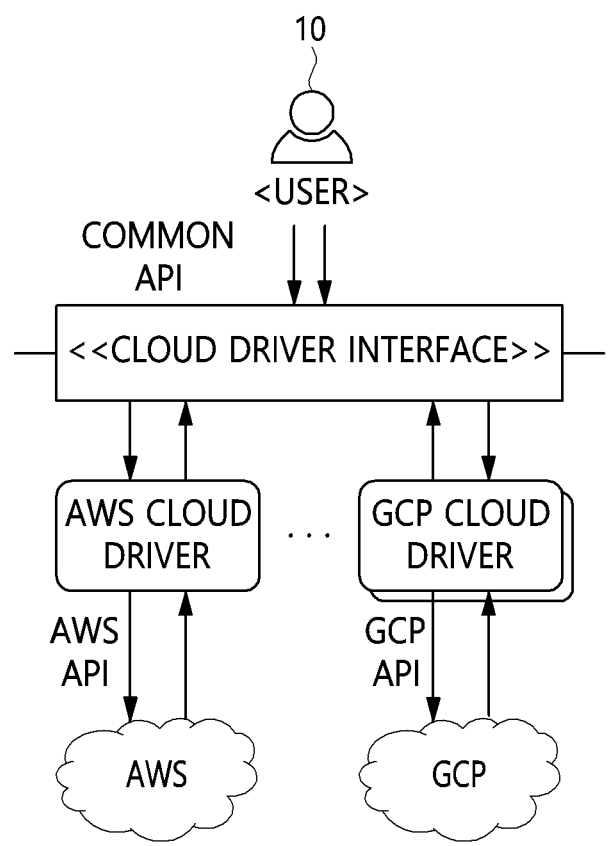
FIG. 18 is a view illustrating a specific example of the cloud driver interface illustrated in FIG. 16.

FIG. 13 is a block diagram illustrating a specific example of the infrastructure interoperating unit illustrated in FIG. 3. FIG. 14 is a block diagram illustrating a specific example of the infrastructure interoperating information management unit illustrated in FIG. 13. FIG. 15 is a block diagram illustrating a specific example of the infrastructure common control management unit illustrated in FIG. 13, FIG. 16 is a block diagram illustrating a specific example of the cloud driver common interface illustrated in FIG. 13. FIG. 17 is a block diagram illustrating a specific example of the interoperating history information management unit illustrated in FIG. 13. FIG. 18 is a view illustrating a specific example of the cloud driver interface illustrated in FIG. 16.

Referring to FIG. 13, the infrastructure interoperating unit 140 may include an infrastructure interoperating information management unit 141, an infrastructure interoperating history information management unit 142, an infrastructure common control management unit 143, and cloud drivers 144.

The infrastructure interoperating information management unit 141 may manage information about interoperating with different clouds in an integrated manner in a multi-cloud environment, and may manage cloud infrastructure interoperating information based on which connection to various types of cloud infrastructure can be easily and quickly established.

The cloud infrastructure interoperating information may include information about cloud drivers, information about cloud infrastructure authentication, information about cloud service regions, and the like.

Referring to FIG. 14, the infrastructure interoperating information management unit 141 may include an interoperating information management open API runtime unit, a cloud driver information management unit, a cloud infrastructure authentication information management unit, a cloud infrastructure region information management unit, a cloud infrastructure connection settings information management unit, and a cloud infrastructure interoperating, information operation management unit.

The interoperating information management open API runtime unit may provide an open API runtime server and an open API client in order to provide the function of integrated management of cloud infrastructure interoperating information to a user.

Here, the interoperating information management open API runtime unit may provide the function of integrated management of interoperating information to the user client device 10, which uses a user API based on REST or gRPC.

Here, the interoperating information management open API runtime unit may provide cloud driver information, credential information, and region information to the infrastructure common control management unit 143.

The cloud driver information management unit may provide a driver information management function for interoperating with cloud infrastructure.

The driver information management function may include the functions of registering, providing, modifying, and deleting cloud driver information.

The cloud driver information may include a driver name, the name of a cloud service provider (CSP), a driver library path, and the like.

The cloud infrastructure authentication information management unit may provide a credential information management function for connection with cloud infrastructure and authentication of cloud infrastructure.

The credential information management function may include the functions of registering, providing, modifying, and deleting cloud authentication information.

The cloud authentication information may include a credential name, a cloud infrastructure service endpoint, cloud infrastructure credential information, and the like.

The cloud infrastructure region information management unit may provide a region information management function for the cloud infrastructure service with which to intemperate.

The region information management function may include the functions of registering, providing and deleting cloud region information.

The region information may further include zone information.

The cloud infrastructure connection settings information management unit may register, provide, modify, delete, and manage cloud connection settings information required for connection with cloud infrastructure.

The cloud connection settings information may include the name of cloud connection settings, a cloud driver name, a cloud credential name, a cloud region name, and the like.

The cloud infrastructure interoperating information operation management unit may provide the function of managing operation information for integrated management of the cloud infrastructure interoperating information.

Here, the cloud infrastructure interoperating information operation management unit may manage operation information included in a DB manager 140a based on a CB-store.

The operation information may include the above-described cloud driver information, credential information, region information, and the like.

The infrastructure interoperating history information management unit 142 may collect and provide information about a history of interoperating with various types of cloud infrastructure.

The cloud infrastructure interoperating history information may include information about a history of services for connection with cloud infrastructure and a virtual machine and for function calls.

Here, the cloud infrastructure interoperating history information may include a response speed, an error message, and the like.

Here, using the cloud infrastructure interoperating history information, the user client device 10 may improve the accuracy of prediction of cloud infrastructure service quality and accuracy in selection of specific cloud infrastructure resources.

Referring to FIG. 17, the infrastructure interoperating history information management unit 142 may provide a cloud infrastructure interoperating history information provision function and a cloud infrastructure interoperating history information collection function.

The cloud infrastructure interoperating history information provision function may provide and enable visualization of information about a history of interoperating with cloud infrastructure, and may provide and enable visualization of information about a history of execution of virtual machine commands.

The cloud infrastructure interoperating history information collection function may collect information about a history of interoperating with cloud infrastructure and information about a history of execution of virtual machine commands.

The infrastructure common control management unit 143 may provide control and management functions using a uniform common API for the multi-cloud infrastructure resources and virtual machines for providing different functions and APIs.

Here, the infrastructure common control management unit 143 may provide a cloud driver common interface 143a and a driver plug-in structure that implements the cloud driver common interface in order to provide uniform control.

Here, the infrastructure common control management unit 143 may provide a dynamically expandable library structure that enables interoperating with a new cloud driver during system operation.

Referring to FIG. 15, the infrastructure common control management unit 143 may include a cloud driver management unit, a cloud driver common interface unit, and a virtual machine command remote management unit.

The cloud driver management unit may manage the driver of the cloud infrastructure with which to interoperate.

The cloud driver management unit ma dynamically load a cloud driver in the form of a shared library into memory using a cloud-driver-loading function.

The cloud driver management unit may provide the loaded cloud driver using a cloud driver provision function.

The cloud driver management unit may delete the loaded cloud driver from memory using a cloud-driver-unloading function.

The cloud driver common interface unit may provide a common interface for uniform control and management of cloud infrastructure resources and virtual machines.

Referring to FIG. 16, it can be seen that a specific example of the cloud driver common interface unit 143a is illustrated.

The cloud driver common interface unit 143a may include a cloud driver interface unit, a cloud connection management interface unit, a cloud infrastructure resource interface unit, and a virtual machine lifecycle control interface unit.

The cloud driver interface unit may provide cloud driver version information.

Here, the cloud driver interface unit may provide a list of functions provided by a cloud driver.

Here the cloud driver interface unit may provide interfaces for generation of a target cloud connection object and cloud connection management.

The cloud connection management interface unit may provide information about the current cloud connection state.

Here, the cloud connection management interface unit may provide a cloud infrastructure resource control interface.

The cloud connection management interface unit may provide a virtual machine lifecycle control interface.

The cloud infrastructure resource control interface unit may provide an image resource control interface, a network resource control interface, a Network Interface Card (NIC) resource control interface, a security group resource control interface, a public IP resource control interface, and a keypair resource control interface.

The image resource control interface may enable generation of an image of a target cloud, provision of a list of images and detailed information of the images, deletion of an image, and the like.

The network resource control interface may enable generation of a network resource of a target cloud, provision of a list of network resources and detailed information of the network resources, deletion of a network and the like.

The NIC resource control interface may enable generation of an NIC resource of a target cloud, provision of a list of NIC resources and detailed information of the NW resources, deletion of an NIC, and the like.

The security group resource control interface may enable generation of a security group, such as a firewall of a target cloud, provision of a list of security groups and detailed information of the security groups, deletion of a security group, and the like.

The public IP resource control interface may enable generation of a public IP resource of a target cloud, provision of a list of public IP resources and detailed information of the public IP resources, deletion of a public IP, and the like.

The keypair resource control interface may enable generation of a keypair resource of a target cloud, provision of a list of keypair resources and detailed information of the keypair resources, deletion of a keypair, and the like.

The virtual machine lifecycle control interface unit may provide a list of virtual machines, detailed information on a specific virtual machine, a virtual machine state list, information about the state of a specific virtual machine, and the functions of running and terminating a virtual machine, suspension and resumption of a virtual machine, rebooting a virtual machine, and the like.

Referring again to FIG. 15, the virtual machine command remote management unit may provide the function of executing a command in a virtual machine that is run by the user client device 10.

Here, the virtual machine command remote management unit may provide a virtual machine file copy function and a virtual machine internal command execution function.

The virtual machine file copy function may copy a specific local file, such as a command, into a virtual machine.

Here, the virtual machine file copy function may copy a file present in a virtual machine into local storage.

The virtual machine internal command execution function may execute internal commands, such as a utility, a script, or the like, present in a remote virtual machine.

The cloud drivers 144 may include a dynamic library that is developed in compliance with a cloud driver common interface specification, and may provide the functions of connecting to a target cloud and controlling the target cloud.

Referring to FIG. 18, the cloud driver may be implemented in the form of a shared library corresponding to a cloud driver common interface.

All or some of the functions provided by individual drivers may be provided by the cloud driver common interface.

The user client device 10 may check a list of functions provided by the cloud drivers.

Here, the user client device 10 may determine whether the driver provides a specific function using the list of functions.

The multi-cloud infrastructure platform apparatus 100 may operate multiple cloud drivers in the infrastructure of a single cloud by developing and plugging in the multiple cloud drivers depending on the user application or the purpose of operation.

The cloud driver may provide a plug-in-based common API, a common control function, and a cloud infrastructure dynamic expansion function based on dynamic addition of drivers.

The plug-in-based common API and the common control function may provide a plug-in mechanism using a driver method in order to provide different cloud infrastructure connection methods and interfaces to the user client device 10 through a common API and a common control function.

The driver method may provide a function to the user client device 10 using only a single interface even when different drivers are implemented using the same common interface.

The cloud infrastructure dynamic expansion function based on dynamic addition of drivers may provide a cloud infrastructure dynamic expansion function such that interoperating with new cloud infrastructure is possible during system operation without interruption thereof.

Figure 19:
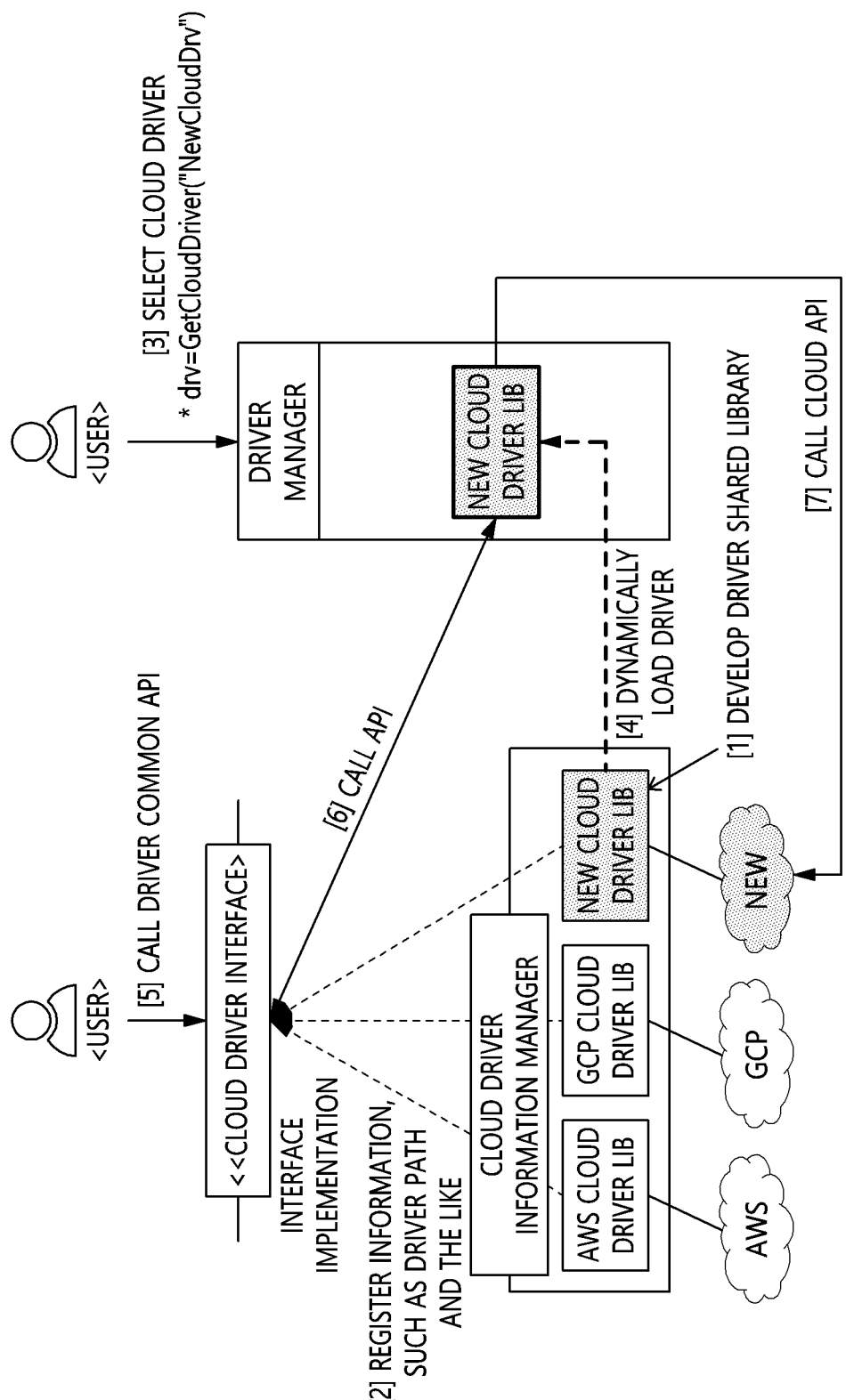
FIG. 19 is a view illustrating a new cloud driver management function based on a dynamic plug-in according to an embodiment of the present invention.

FIG. 19 is a view illustrating a new cloud driver management function based on a dynamic plug-in according to an embodiment of the present invention.

Referring to FIG. 19 the infrastructure into operating unit 140 may generate a new cloud driver shared library that implements a cloud common interface, and may copy the same into a local file system of the system.

The infrastructure interoperating information management unit 141 may register the name path, and the like of a new cloud driver using the cloud driver information management function.

The user client device 10 may select a new cloud driver object using the cloud driver management function of the infrastructure common control management unit 143 in order to use new cloud infrastructure.

The infrastructure interoperating information management unit 141 may dynamically load a new cloud driver from the new cloud library, corresponding to the selected new cloud driver object, into the cloud driver management unit of the infrastructure common control management unit 143.

Here, when the user client device 10 calls a driver common API through the cloud driver interface, the cloud driver interface may call the API of the new cloud driver loaded into the cloud driver management unit.

Here, the new cloud driver finally calls the API of the new cloud infrastructure, thereby providing resources and a virtual machine to the user client device 10.

Figure 20:
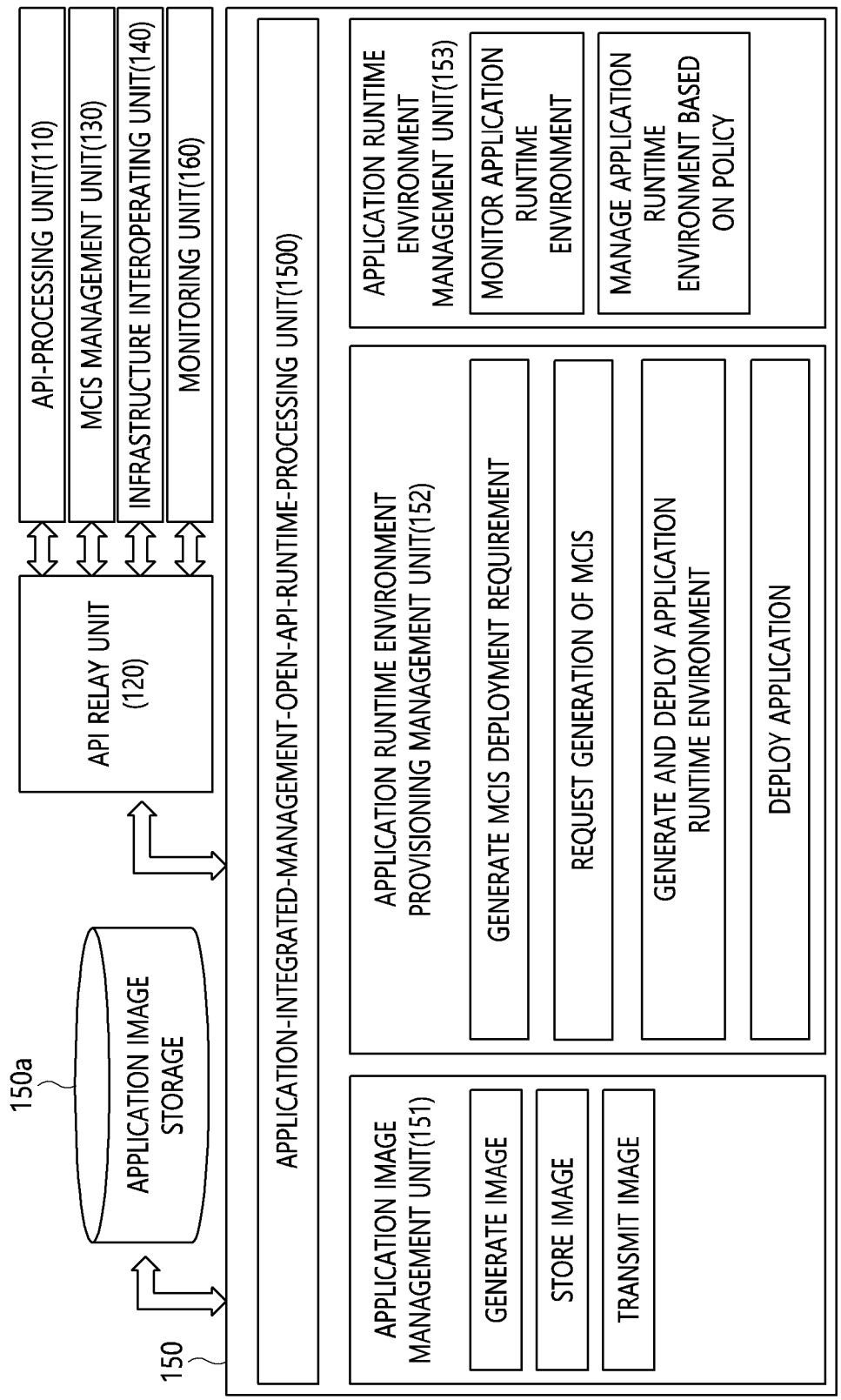
FIG. 20 is a block diagram illustrating a specific example of the application management unit illustrated in FIG. 3.
Figure 21:
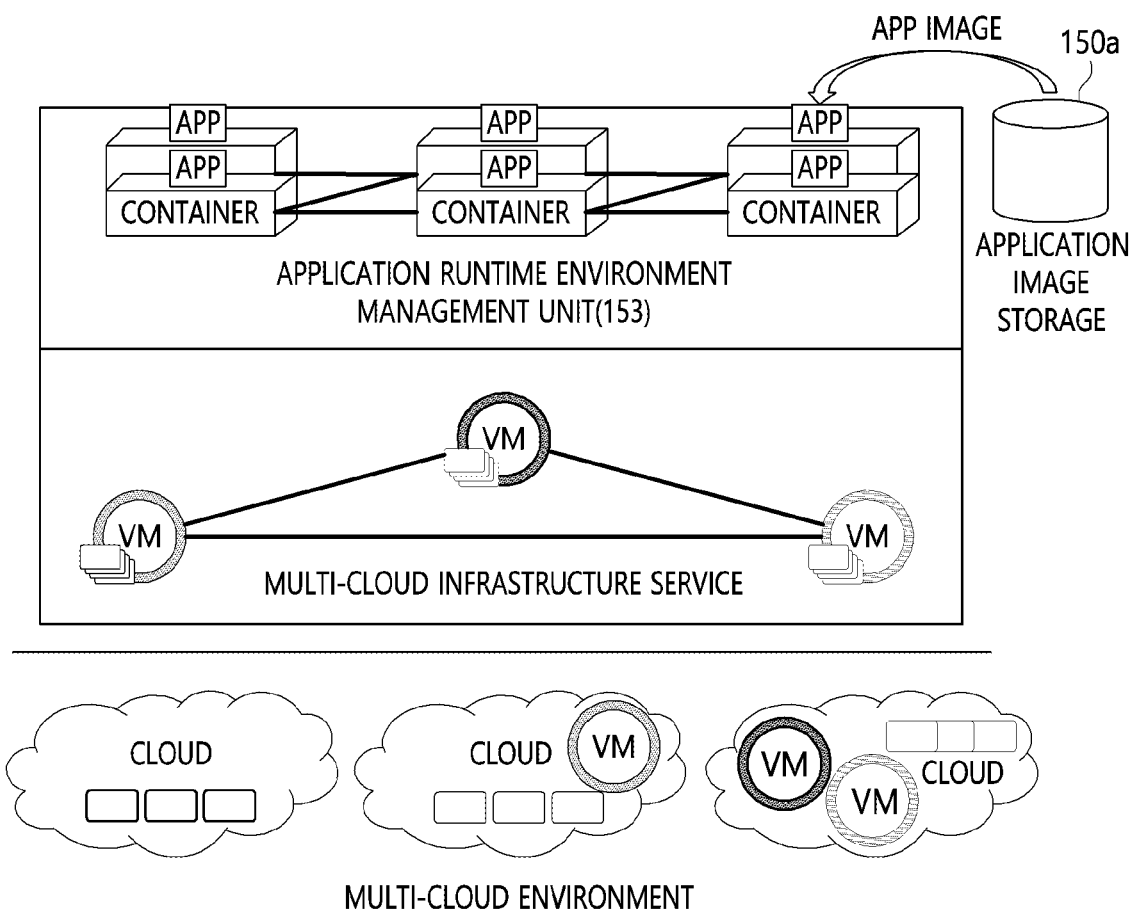
FIG. 21 is as view illustrating a multi-cloud application runtime environment according; to an embodiment of the present invention.

FIG. 20 is a block diagram illustrating a specific example of the application management unit illustrated FIG. 3. FIG. 21 is a view illustrating a multi-cloud application runtime environment according to an embodiment of the present invention.

Referring to FIG. 20, the application management unit 150 may include an application image management unit 151, an application runtime environment provisioning management unit 152, an application runtime environment management writ 153, and an application-integrated-management-open-API-run time-processing unit 1500.

The application image management unit 151 may provide a function of generating a container environment, in which the source code of an application or the application is distributed, as an image.

Here, the application image management unit 151 may provide the function of storing an app image in application image storage 150a and the function of loading the image stored in the application image storage 150a according, to need.

The application runtime environment provisioning management unit 152 may generate and manage an MCIS (e.g., a computing-resource pool configured with VMs placed across multiple clouds) using the MCIS management unit 130, and may generate and deploy an application runtime environment (a container or the like) on the generated MCIS.

Here, the application runtime environment provisioning management unit 152 may bring (pull) the application desired by a user using the application image management unit 151 according to need when a container is generated, and may deploy the corresponding application in the container depending on the image and settings.

The application runtime environment management unit 153 may monitor resource usage in the application runtime environment, may use the monitoring information and check the state based on the policy defined by the user, and may take an action according to the policy defined by the user.

For example, the poky defined by the user may be a policy in which, when the CPU usage in the application runtime environment is equal to or greater than 95%, expansion is performed so as to execute the same application in a new execution environment.

Referring to FIG. 21, the application runtime environment management unit 153 may provide a multi-cloud application runtime environment on the multi-cloud infrastructure service (MCIS).

Here, the application runtime environment management unit 153 may deploy an application in the form of an image tan app image) in a container through the application image storage 150a such that the application is capable of being run in the execution environment over the multi-cloud infrastructure, and may enable operation and management thereof.

Figure 22:
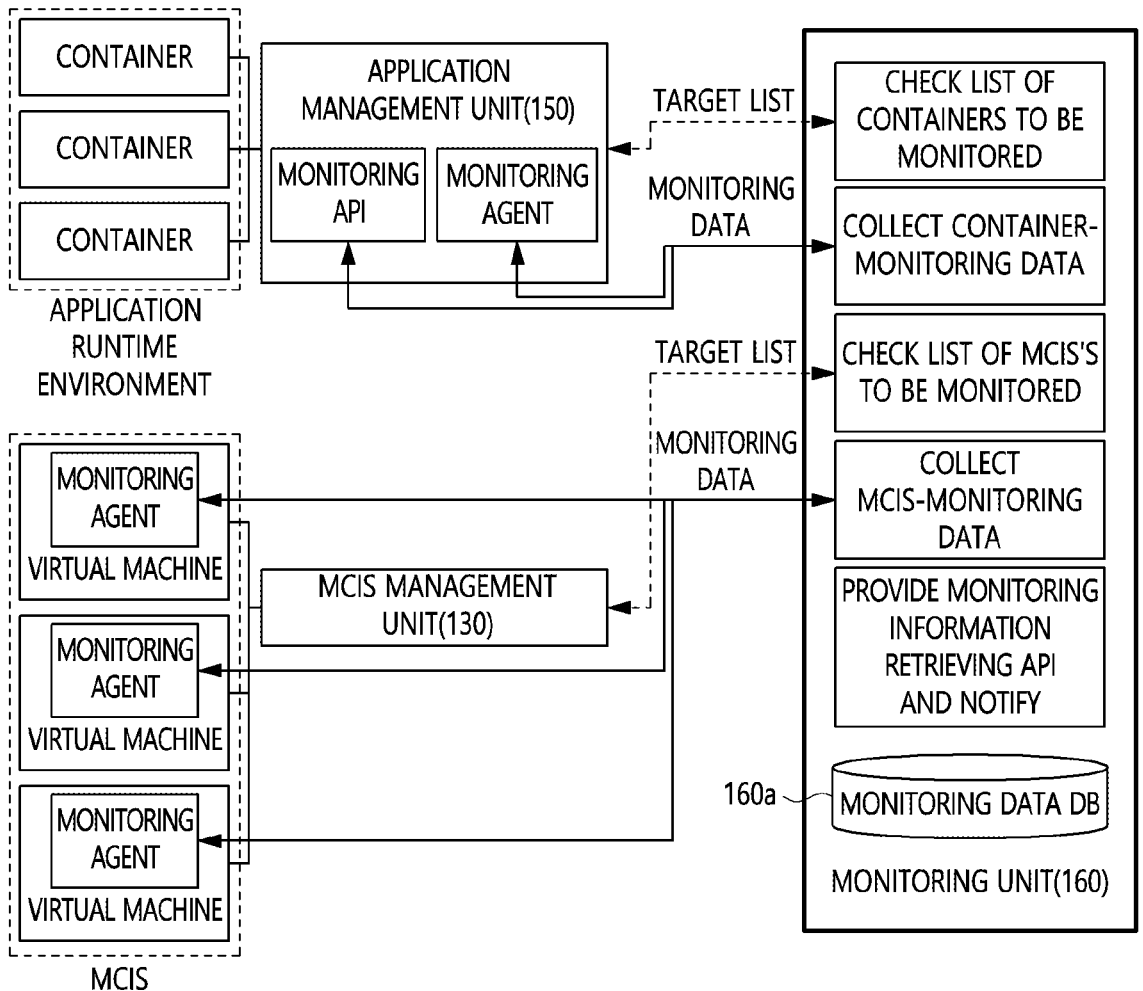
FIG. 22 is a block diagram illustrating a specific example of the monitoring unit illustrated in FIG. 3.

FIG. 22 is a block diagram illustrating a specific example of the monitoring unit illustrated in FIG. 3.

Referring to FIG. 22, the monitoring unit 160 may perform monitoring of a multi-cloud infrastructure service (MCIS) and computing resources included in the MCIS.

Here, the monitoring unit 160 may check an MCIS monitoring target list through the MCIS management unit 130, ma install a monitoring agent in the target MCIS and internal computing resources (e.g., VMs), and may collect and store MCIS-monitoring data using the agent.

Also, the monitoring unit 160 may check the workload of an application by monitoring an application runtime environment.

Here, the monitoring unit 160 may check a list comprising the execution environments to be monitored (e.g., containers) using the application management unit 150, and may collect and store monitoring data by installing a monitoring API or a monitoring agent that manages all containers.

The monitoring unit 160 may provide the collected and stored monitoring data using an API, and may provide the sank to a specific external service according to a preset condition.

Figure 23:
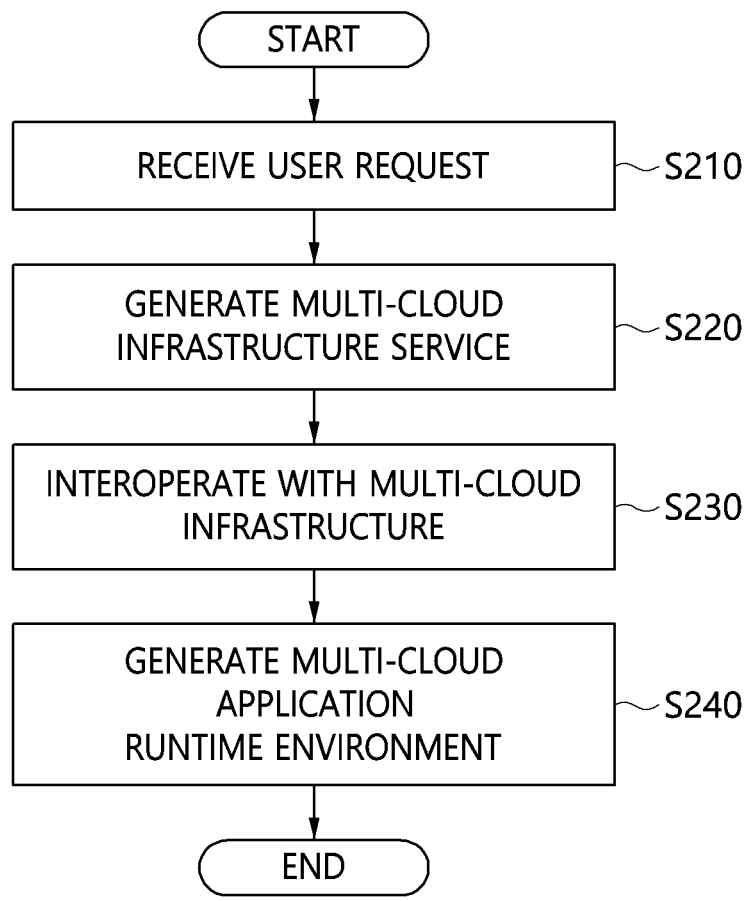
FIG. 23 is a flowchart illustrating a method for a multi-cloud service platform according to an embodiment of the present invention.

FIG. 23 is a flowchart illustrating a method for a multi-cloud service platform according to an embodiment of the present invention.

Referring to FIG. 23, in the method for the multi-cloud service platform accordion to an embodiment of the present invention, a user request may be received at step S210.

That is, at step S210, a service request may be received from a user client device 10.

Here, at step S210, an open API for using a system and a web user interface (UI) and a command-line interface (CLI) for management convenience may be provided.

Here, at step S210, the functions of a multi-cloud infrastructure service may be provided to the user client device 10 through the web the CLI, and the open API.

Here, at step S210, the functions of die multi-cloud infrastructure service may be provided to a platform and software 20 through the open API.

For example, the platform and the software 20 may include a multi-cloud management platform (MCMP) a cloud service brokerage platform (CSB), and the like.

Here, at step S210, the user interface of the platform may be provided.

Here, at step S210, interoperating and convenience in function expansion may be provided by relaying an API between subsystems.

Here, at step S210, requests for functions required by the subsystems may be received, and the results thereof may be returned.

Also, in the method for the multi-cloud service platform according to an embodiment of the present invention, a multi-cloud infrastructure service may be generated at step S220.

That is, at step S220, in response to the service request, a multi-cloud infrastructure service (MCIS) may be generated using multiple clouds.

Here, at step S220 operation and integrated management of the multi-cloud infrastructure service may be provided m a manner tint supports optimal deployment based on user requirements.

Here, at step S220, the multi-cloud infrastructure service may be generated using computing machines corresponding to the service request, among computing machines included in the multiple clouds.

Here, the types of the computing machines may include a virtual machine, a container machine, and the like.

Here, at step S220, whether the computing machines correspond to the service request may be determined by collecting static information about the specifications of the computing machines and dynamic performance information about the result of a benchmark performed on the computing machines.

Here, at step S220, information about the network latency between the computing machines is collected, and computing machines between which the network latency is equal to or less than a preset delay time may be selected.

Also, in the method for the multi-cloud service platform according to an embodiment of the present invention, interoperating with the multi-cloud infrastructure may be performed at step S230.

That is, at step S230, in order to provide the multi-cloud infrastructure service, the multiple clouds may be made to intemperate with the multi-cloud infrastructure.

Here, at step S230, interoperating with heterogeneous multi-cloud infrastructure may be performed using a plug-in, and the heterogeneous multi-cloud infrastructure may be managed and controlled in a uniform manner.

Here, at step S230, the multiple clouds may be enabled to interoperate with the multi-cloud infrastructure using the cloud drivers of the multiple clouds, which comply with a common interface specification.

Here, at step S230, the cloud drivers of the multiple clouds are registered in a common cloud driver shared library, and the multiple clouds may be enabled to intemperate with the multi-cloud infrastructure using the cloud drivers registered in the common cloud driver shared library.

Here, at step S230, monitoring; of the multi-cloud infrastructure service and the computing resource included therein may be performed.

Here, at step S230, monitoring information for optimizing management of the multi-cloud infrastructure service may be provided.

Also, in the method for the multi-cloud service platform according to an embodiment of the present invention, a multi-cloud application runtime environment may be generated at step S240.

That is, at step S240, a multi-cloud application runtime environment corresponding to the multi-cloud infrastructure service may be generated.

Here, at step S240, multi-cloud application operation and management for guaranteeing the stability and quality of the application may be supported.

Here, at step S240, the multi-cloud application runtime environment may be generated using an application image corresponding to the multi-cloud infrastructure service.

Here, at step S240, monitoring of the application workload and the application runtime environment may be provided.

Here, at step S240, monitoring information for optimizing management of the multi-cloud application may be provided.

Figure 24:
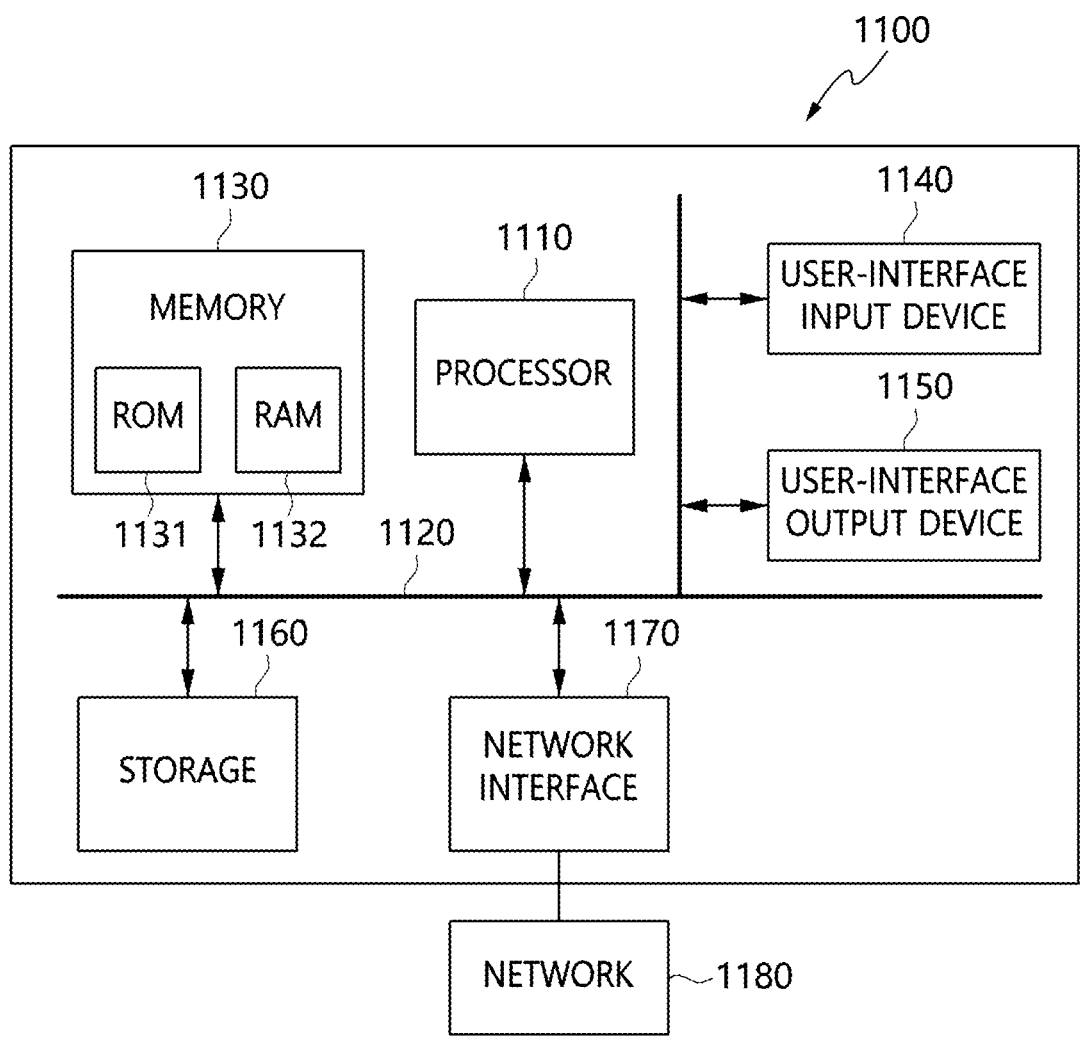
FIG. 24 is a view illustrating a computer system according to an embodiment of the present invention.

FIG. 24 is a view illustrating a computer system according to an embodiment of the present invention.

Referring to FIG. 24, the multi-cloud service platform apparatus according to an embodiment of the present invention may be implemented in a computer system 1100 including a computer-readable recording medium. As illustrated in FIG. 24, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160, The memory 1130 and the storage 1160 may be any of various types of volatile or nonvolatile storage media. For example, the memory may include ROM 1131 or RAM 1132.

The multi-cloud service platform apparatus according to an embodiment of the present invention may include one or more processors 1110 and executable memory 1130 for storing at least one program executed b the one or more: processors 1110. The at least one program may receive a service request from a user client device, generate a multi-cloud infrastructure service using multiple clouds in response to the service request, make the multiple clouds interoperate with multi-cloud infrastructure M order to provide the multi-cloud infrastructure service, and generate a multi-cloud application runtime environment corresponding to the multi-cloud infrastructure service.

Here, the at least one program max generate the multi-cloud infrastructure service using computing machines corresponding to the service request, among computing machines included in the multiple clouds.

Here, the at least one program may determine whether the computing machines correspond to the service request by collecting static information about the specifications of the computing machines and dynamic performance information about a result of a benchmark performed on the computing machines.

Here, the at least one program may collect information about network latency between the computing machines, and may select computing machines between which the latency is equal to or less than a preset delay time.

Here, the at least one program may make the multiple clouds interoperate with the multi-cloud infrastructure using cloud drivers of the multiple clouds, the cloud drivers complying with a common interface specification.

Here, the at least one program may register the cloud drivers of the multiple clouds in a common cloud driver shared library, and may make the multiple clouds interoperate with the multi-cloud infrastructure using the cloud drivers registered in the common cloud driver shared library.

Here, the at least one program may generate a multi-cloud application runtime environment using an application image corresponding to the multi-cloud infrastructure service.

The present invention may enable the resources and services of multiple clouds to be operated and managed in common, and may provide an application runtime environment in order for a user to easily develop and distribute an application.

Also, the present invention may provide interoperating with multi-cloud infrastructure, control and management of multi-cloud infrastructure, and plug-in-based dynamic expansion of a cloud.

Also, the present invention may provide integrated management for a multi-cloud infrastructure service suitable for user requirements.

Also, the present invention ma provide an environment for facilitating the management of a multi-cloud infrastructure service and application, and may guarantee the quality and availability thereof.

As described above, the apparatus and method for a multi-cloud service platform according to the present, invention are not limitedly applied to the configurations and operations of the above-described embodiments, but all or some of the embodiments may be selectively combined and configured, so the embodiments may be modified in various ways.

What is claimed is:

1. An apparatus for a multi-cloud service platform, comprising:
one or more processors; and
executable memory for storing at least one program executed by the one or more processors,
wherein the at least one program
receives a service request from a user client device,
generates a multi-cloud infrastructure service using multiple clouds in response to the service request,
makes the multiple clouds interoperate with multi-cloud infrastructure in order to provide the multi-cloud infrastructure service, and
generates a multi-cloud application runtime environment corresponding to the multi-cloud infrastructure service,
wherein the at least one program
generates the multi-cloud infrastructure service using computing machines corresponding to the service request, among computing machines included in the multiple clouds,
collects static information about specifications of the computing machines and dynamic performance information about a result of a benchmark performed on the computing machines,
determines whether the computing machines correspond to the service request based on the collected information,
collects information about network latency between the computing machines,
selects computing machines based on the network latency,
deploys the computing machines using the static information, the dynamic performance information, and the information about network latency based on the service request,
generates the multi-cloud infrastructure corresponding to the deployed computing machines,
manages a lifecycle state of the multi-cloud infrastructure service for each multi-cloud infrastructure service and the computing machines included therein,
checks whether the lifecycle state of the multi-cloud infrastructure service is the same as a lifecycle state of an actual computing machines managed by a cloud service provider,
synchronizes the lifecycle state of the multi-cloud infrastructure service and the lifecycle state of the actual computing machines with each other,
handles a lifecycle-related control request received from the user client device,
collects cloud infrastructure interoperating history information about a history of interoperating with various types of cloud infrastructure,
supports improvement in the accuracy of selection of cloud infrastructure and manages information about interoperating with different clouds in an integrated manner in a multi-cloud environment, using the cloud infrastructure interoperating history information,
wherein the cloud infrastructure interoperating history information includes information about a history of services for connection with cloud infrastructure and a virtual machine and for function calls,
wherein the cloud infrastructure interoperating history information includes a response speed and an error message, and
wherein the user client device predicts cloud infrastructure service quality and selects cloud infrastructure resources using the cloud infrastructure interoperating history information,
manages cloud driver information for interoperating with cloud infrastructure,
wherein the cloud driver information includes a driver name, a cloud service provider (CSP) name and a driver library path,
generates a new cloud driver shared library that implements a cloud common interface,
copies the new cloud driver into a local file system of a system, and
registers a name and a path of the new cloud driver to the cloud driver information,
wherein the user client device selects the new cloud driver using the cloud driver information in order to use new cloud infrastructure corresponding to the new cloud driver, and
wherein the new cloud driver calls an API of the new cloud infrastructure, thereby providing resources and a virtual machine to the user client device.

2. The apparatus of claim 1, wherein the at least one program makes the multiple clouds interoperate with the multi-cloud infrastructure using cloud drivers of the multiple clouds, the cloud drivers complying with a common interface specification.

3. The apparatus of claim 2, wherein the at least one program registers the cloud drivers of the multiple clouds in a common cloud driver shared library and makes the multiple clouds interoperate with the multi-cloud infrastructure using the cloud drivers registered in the common cloud driver shared library.

4. The apparatus of claim 1, wherein the at least one program generates the multi-cloud application runtime environment using an application image corresponding to the multi-cloud infrastructure service.

5. A method for a multi-cloud service platform, performed by an apparatus for the multi-cloud service platform, comprising:
receiving a service request from a user client device;
generating a multi-cloud infrastructure service using multiple clouds in response to the service request;
making the multiple clouds interoperate with multi-cloud infrastructure in order to provide the multi-cloud infrastructure service; and
generating a multi-cloud application runtime environment corresponding to the multi-cloud infrastructure service,
wherein generating the multi-cloud infrastructure service includes:
generating the multi-cloud infrastructure service using computing machines corresponding to the service request, among computing machines included in the multiple clouds;
collecting static information about specifications of the computing machines and dynamic performance information about a result of a benchmark performed on the computing machines;
determining whether the computing machines correspond to the service request based on the collected information;
collecting information about network latency between the computing machines;
selecting computing machines based on the network latency;
deploying the computing machines using the static information, the dynamic performance information, and the information about network latency based on the service request; and
generating the multi-cloud infrastructure corresponding to the deployed computing machines, wherein making the multiple clouds interoperate with multi-cloud infrastructure includes:
  managing a lifecycle state of the multi-cloud infrastructure service for each multi-cloud infrastructure service and the computing machines included therein;
  checking whether the lifecycle state of the multi-cloud infrastructure service is the same as a lifecycle state of an actual computing machines managed by a cloud service provider;
  synchronizing the lifecycle state of the multi-cloud infrastructure service and the lifecycle state of the actual computing machines with each other;
  handling a lifecycle-related control request received from the user client device;
  collecting cloud infrastructure interoperating history information about a history of interoperating with various types of cloud infrastructure;
  supporting improvement in the accuracy of selection of cloud infrastructure and managing information about interoperating with different clouds in an integrated manner in a multi-cloud environment, using the cloud infrastructure interoperating history information,
    wherein the cloud infrastructure interoperating history information includes information about a history of services for connection with cloud infrastructure and a virtual machine and for function calls, and
    wherein the cloud infrastructure interoperating history information includes a response speed and an error message;
  predicting cloud infrastructure service quality and selecting cloud infrastructure resources using the cloud infrastructure interoperating history information by the user client device;
  managing cloud driver information for interoperating with cloud infrastructure,
    wherein the cloud driver information includes a driver name, a cloud service provider (CSP) name and a driver library path;
  generating a new cloud driver shared library that implements a cloud common interface;
  copying the new cloud driver into a local file system of a system;
  registering a name and a path of the new cloud driver to the cloud driver information;
  selecting the new cloud driver using the cloud driver information in order to use new cloud infrastructure corresponding to the new cloud driver by the user client device; and
  calling an API of the new cloud infrastructure by the new cloud driver, thereby providing resources and a virtual machine to the user client device.

6. The method of claim 5, wherein making the multiple clouds interoperate with the multi-cloud infrastructure is configured to make the multiple clouds interoperate with the multi-cloud infrastructure using cloud drivers of the multiple clouds, the cloud drivers complying with a common interface specification.

7. The method of claim 6, wherein making the multiple clouds interoperate with the multi-cloud infrastructure is configured to register the cloud drivers of the multiple clouds in a common cloud driver shared library and to make the multiple clouds interoperate with the multi-cloud infrastructure using the cloud drivers registered in the common cloud driver shared library.

8. The method of claim 5, wherein generating the multi-cloud application runtime environment is configured to generate the multi-cloud application runtime environment using an application image corresponding to the multi-cloud infrastructure service.

* * * * *